United States Patent
Doi et al.

[15] 3,644,761
[45] Feb. 22, 1972

[54] $LiTaO_3$ PIEZOELECTRIC VIBRATORS

[72] Inventors: Kikuo Doi; Masao Takahashi; Satoshi Nanamatsu; Yoshio Fujino, all of Tokyo, Japan

[73] Assignee: Nippon Electric Company, Limited, Minato-ku, Tokyo, Japan

[22] Filed: Sept. 2, 1970

[21] Appl. No.: 68,915

[30] Foreign Application Priority Data

Sept. 3, 1969 Japan....................................44/70201
Dec. 13, 1969 Japan....................................44/100307

[52] U.S. Cl.....................................................310/9.5
[51] Int. Cl.....................................................H01v 7/02
[58] Field of Search..................................310/9.5; 252/62.9

[56] References Cited

UNITED STATES PATENTS

| | | | |
|---|---|---|---|
| 2,485,129 | 10/1949 | Bauerwald | 310/9.5 |
| 3,461,408 | 8/1969 | Onoe et al. | 310/9.5 X |
| 3,525,885 | 8/1970 | Ballman et al. | 310/9.5 |

*Primary Examiner*—William M. Shoop, Jr.
*Assistant Examiner*—Mark O. Budd
*Attorney*—Sandoe, Hopgood and Calimafde

[57] ABSTRACT

Piezoelectric lithium tantalate ($LiTaO_3$) single-crystal vibrator plates employ a range of crystal orientations which coincidentally give rise to good piezoelectric activity and a temperature stable resonant frequency.

8 Claims, 12 Drawing Figures

INVENTORS
KIKUO DOI
MASAO TAKAHASHI
SATOSHI NANAMATSU
YOSHIO FUJINO
by
Sandoe, Hopgood & Calimafde
ATTORNEYS INVENTORS
KIKUO DOI
MASAO TAKAHASHI
SATOSHI NANAMATSU
YOSHIO FUJINO
by Sandoe, Hopgood & Calimafde
ATTORNEYS INVENTORS
KIKUO DOI
MASAO TAKAHASHI
SATOSHI NANAMATSU
YOSHIO FUJINO
by
Sandoe, Hopgood & Calimafde
ATTORNEYS INVENTORS
KIKUO DOI
MASAO TAKAHASHI
SATOSHI NANAMATSU
YOSHIO FUJINO
by Sandoe, Hopgood & Calimafde
ATTORNEYS INVENTORS
KIKUO DOI
MASAO TAKAHASHI
SATOSHI NANAMATSU
YOSHIO FUJINO
by Sandoe, Hopgood & Calimafde
ATTORNEYS INVENTORS
KIKUO DOI
MASAO TAKAHASHI
SATOSHI NANAMATSO
YOSHIO FUJINO
by Sandoe, Hopgood & Calimafde
ATTORNEYS INVENTORS
KIKUO DOI
MASAO TAKAHASHI
SATOSHI NANAMATSU
YOSHIO FUJINO
by Sandoe, Hopgood & Calimafde
ATTORNEYS INVENTORS
KIKUO DOI
MASAO TAKAHASHI
SATOSHI NANAMATSU
YOSHIO FUJINO
by
Sandoe, Hopgood & Calimafde
ATTORNEYS INVENTORS
KIKUO DOI
MASAO TAKAHASHI
SATOSHI NANAMATSU
YOSHIO FUJINO
by Sandoe, Hopgood & Calimafde
ATTORNEYS

*INVENTORS*
KIKUO DOI
MASAO TAKAHASHI
SATOSHI NANAMATSU
YOSHIO FUJINO
by Sandoe, Hopgood & Calimafde
ATTORNEYS

LITHIUM TANTALATE PIEZOELECTRIC VIBRATORS

This invention relates to a piezoelectric vibrator formed of ferroelectric single-crystal lithium tantalate ($LiTaO_3$) more and particularly, to a piezoelectric vibrator of this type characterized by a resonance frequency which is very stable with respect to temperature.

Piezoelectric vibrators have a wide application in various fields such as electrical wave filters, mechanical filters, oscillators, transducers and the like. Quartz crystals have been used for a long time as a material for a piezoelectric vibrator having an excellent temperature-stability characteristic. However, the piezoelectric activity of quartz crystals is relatively small. In particular, its electromechanical coupling factor, which is generally regarded as the most fundamental property for evaluating piezoelectricity, is about 10 percent at best.

It has therefore been desired to develop new materials having a good piezoelectric activity and recently, such single-crystal piezoelectric materials as $LiNbO_3$, $LiTaO_3$, $Ba_2NaBb_5$ 015 and the like have been proposed. However, these new single-crystal piezoelectric materials differ from quartz crystals in their crystallographic properties. Accordingly, it has been quite difficult to apply the technology of quartz crystals directly to these piezoelectric materials. Particularly, the technology of quartz crystals is useless in determining the orientation which permits the piezoelectric materials to exhibit a good temperature-stability characteristic.

An object of the invention is to provide a piezoelectric vibrator formed of single-crystal $LiTaO_3$ which is characterized by a high piezoelectric activity and a resonance frequency which is stable with respect to temperature.

The present invention is based on the recognition that a vibrator element cut from single-crystal $LiTaO_3$ exhibits a temperature-stable resonance frequency for specific orientation therefor. The piezoelectric vibrator of the present invention comprises a $LiTaO_3$ single-crystal plate having a $(zxtwl)$ $\phi/\psi/\theta$orientation in which the angles $\phi$ and $\psi$ should lie within the range of 68° to 113° and the range of 22° to 57°, respectively, and the angle $\theta$ should be within either of the ranges of 0° to 50.4° and 130.5° to 180°. Such vibrator may have a temperature coefficient as to its resonance frequency of less than ±20 p.p.m./°C. and an electromechanical coupling factor of more than 10 percent. The temperature coefficient can be made less than ±10 p.p.m./°C., where the angles $\alpha$ and $\psi$ are within the ranges of 75° to 108° and 25° to 54°, respectively.

The invention will be more easily understood by reference to the accompanying drawings in which:

FIG. 1 is illustrative of the $(zxtwl)$ $\phi/\psi/\theta$ orientation of $LiTaO_3$ piezoelectric crystal plates of the invention with respect to the axes of the $LiTaO_3$ single or mother crystal from which they are cut;

FIGS. 2,5 and 8 are graphs, each showing the relationship between the orientation, notably angles $\phi$ and $\psi$, of the $LiTaO_3$ piezoelectric crystal plates and the electromechanical coupling factor thereof, with respect to angle ranges of $\phi$ of approximately 60° to 120°, approximately 180° to 240° and approximately 300° to 360°, respectively, which are in a threefold symmetrical relationship with each other;

Figure 12:
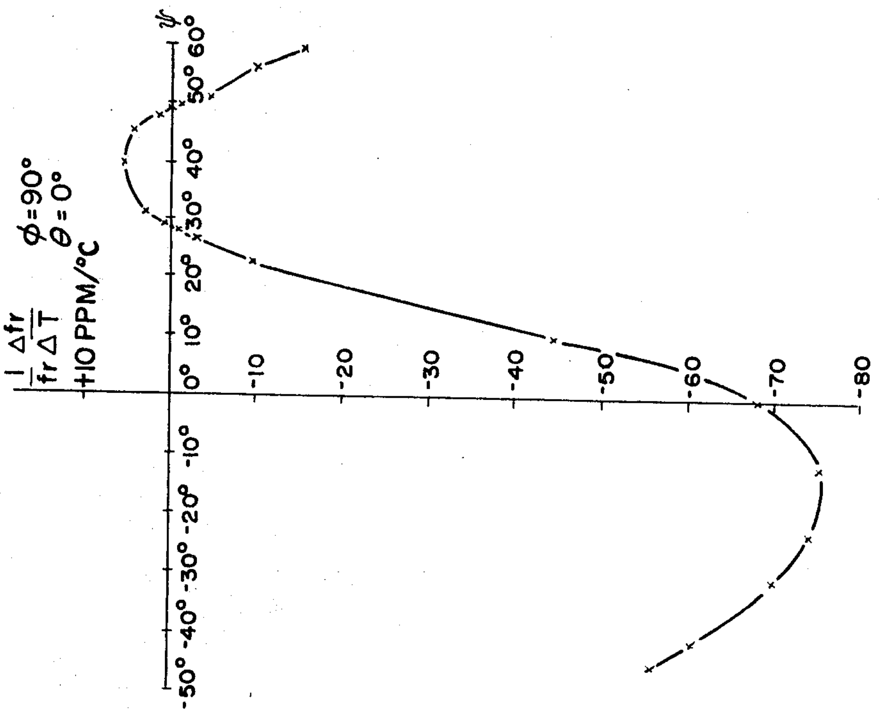
Figure 11:
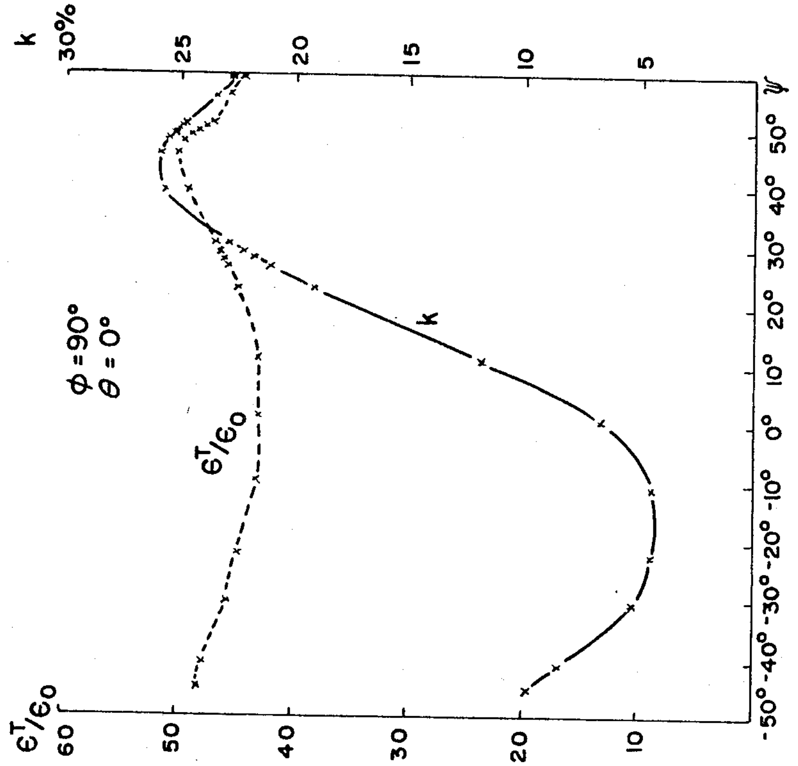

FIG. 11 shows graphs of the electromechanical coupling factor and the specific inductive capacity of the $LiTaO_3$ crystal plates having an orientation wherein the angle $\phi$ is 90° and the angle $\theta$ is 0°, as a function of the angle $\psi$ in the orientation of the plates; and FIG. 12 is a graph of the temperature coefficient of resonance frequency of the $LiTaO_3$ plate with the angles $\phi$ and $\theta$ of 90° and 0°, respectively, as a function of the angle $\psi$.

Figure 1:
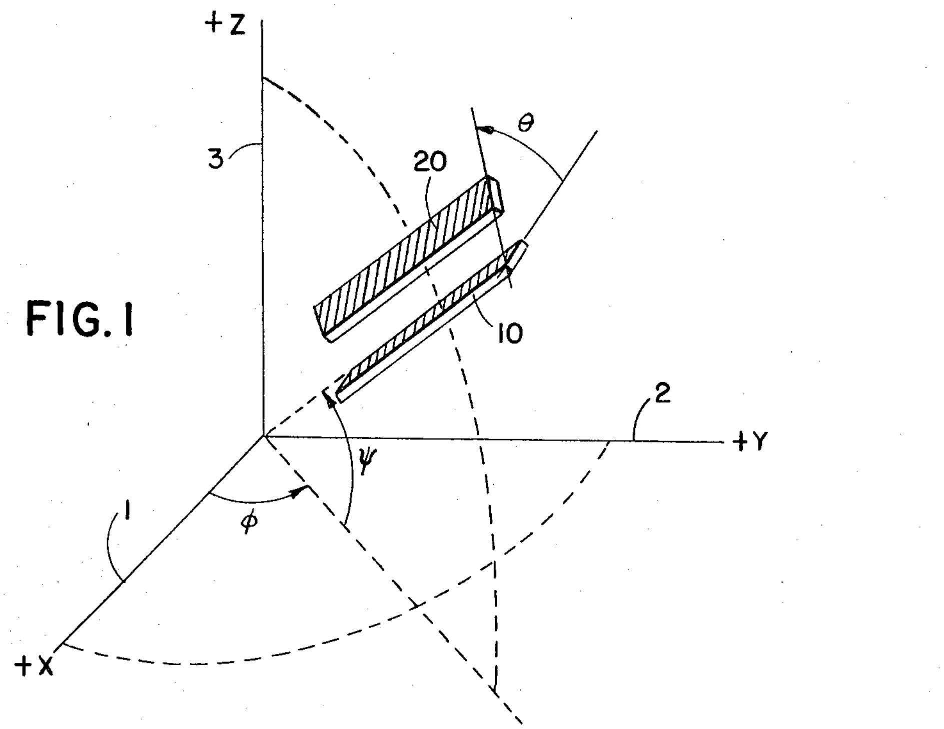

Referring now to FIG. 1, $LiTaO_3$ piezoelectric vibrator plates 10 and 20 are shown together with X, Y and Z axes of the $LiTaO_3$ single or mother crystal from which they are cut. The Z axis is parallel to the $c$ axis, the axis of threefold symmetry, or <001> direction of the $LiTaO_3$ single crystal which belongs to the trigonal system. The X-axis coincides with any one of the three equivalent $a$-axis lying 120° apart in a plane normal to $c$, or <110> direction. The Y-axis is perpendicular to the Z and X axes and coincides with <100> direction. These orientation axes X, Y and Z of the $LiTaO_3$ single crystal are defined according to the definitions in the report "Standards on Piezoelectric Crystals," PROCEEDINGS OF THE I.R.E., Dec. 1949, pages 1,378 to 1,395, particularly on pages 1,383 to 1,384 thereof. Using the standards for specifying crystal plate orientation defined in the report, pages 1,387 to 1,391, the orientation of the $LiTaO_3$ piezoelectric crystal plates of the invention may be expressed by the symbol $$(zxtwl)\phi/\psi/\theta.$$

In this system of notation, the first letter in the parentheses indicates the direction of the plate thickness in the reference position where the plate is first placed for specifying the orientation of the plate. The second letter indicates the direction of the plate length in the reference position. The third to fifth letters of the symbol indicate the plate edges used as axes of rotation, where the third letter is the axis of first rotation of the plate, the fourth letter is the axis of second rotation, and the fifth letter is an axis of final rotation. The parentheses are followed by a list of rotation angles.

In other words, the symbol indicates the position of the crystal plate, where the direction of the plate thickness is at first made coincident with Z-axis with the direction of the plate length coincident with X-axis and the plate thus placed in the reference position is then given a rotation around the edge of the plate in its thickness direction by an angle $\phi$, thereafter the plate is given a further rotation around the edge of the plate in its width direction by an angle $\psi$, (the plate after these rotations is shown at 10 in FIG. 1), and then the plate is further rotated around the edge of the plate in its length direction by an angle $\theta$. The plate 20 shown in FIG. 1 represents the final position. A positive angle of rotation signifies a counterclockwise rotation, as indicated by arrows in the figure.

According to the principles of the present invention, the effective ranges of orientation have been discovered which allow a $LiTaO_3$ piezoelectric single-crystal plate to have good temperature-stability and a high electromechanical coupling factor.

The invention will now be described in detail by extensive examples.

Lithium tantalate ($LiTaO_3$) single crystals of about 14 mm. diameter and 50 mm. length were synthesized by the Czochlarski method and subjected to polarization treatment of 16 v./cm. at 710° C. for 5 minutes in the direction of Z-axis. From these single crystals, rectangular plates were cut, having the various orientations indicated in terms of rotation angles $\phi$, $\psi$ and $\theta$ in Tables 1 to 4. Silver electrodes were coated at 490° C. on two opposite faces of each plate perpendicular to the direction of the plate thickness, and piezoelectric and dielectric properties were measured.

In measuring the electromechanical coupling factor $k$ and the resonance frequency $f_r$, stretching vibration in the direction of plate length was used as the vibration mode and the methods of measurement relied upon were as in "IRE Standards on Piezoelectric Crystals—The Piezoelectric Vibrator: Definitions and Methods of Measurement," PROCEEDINGS OF THE I.R.E., Mar. 1957, pages 353 to 358. The resonance frequencies were measured at various temperatures between −20° C. and +70° C. and the temperature coefficient of resonance frequency $$\frac{1}{f_r}\frac{\Delta f_r}{\Delta T}$$

was calculated on the basis of resonance frequency at room temperature. Measurement of dielectric constant $\epsilon^T$ was carried out at 1 kHz. with a stress-free condition and then the specific inductive capacity $\epsilon^T/\epsilon o$ was calculated, where $\epsilon o$ represents the dielectric constant of a vacuum. Typical results of measurement are shown in Tables 1 to 4.

In Table 1, the results obtained from $LiTaO_3$ plates having the angles $\phi$ of 58° to 121.5°, $\psi$ of 0.1° to 61.5° and $\theta$ of 0.1° to 181.5° are shown. In Tables 2, the angles $\phi$, $\psi$ and $\theta$ of the plates are 179.2° to 242.0°, 0.2° to 61.5° and 0.0° to 182.5°, respectively. Table 3 shows the sample plates in which the angles $\phi$, $\psi$ and $\theta$ are respectively 297.9° to 361.0°, 0.1° to 61.7° and 0.0° to 182.1°.

Figure 2:
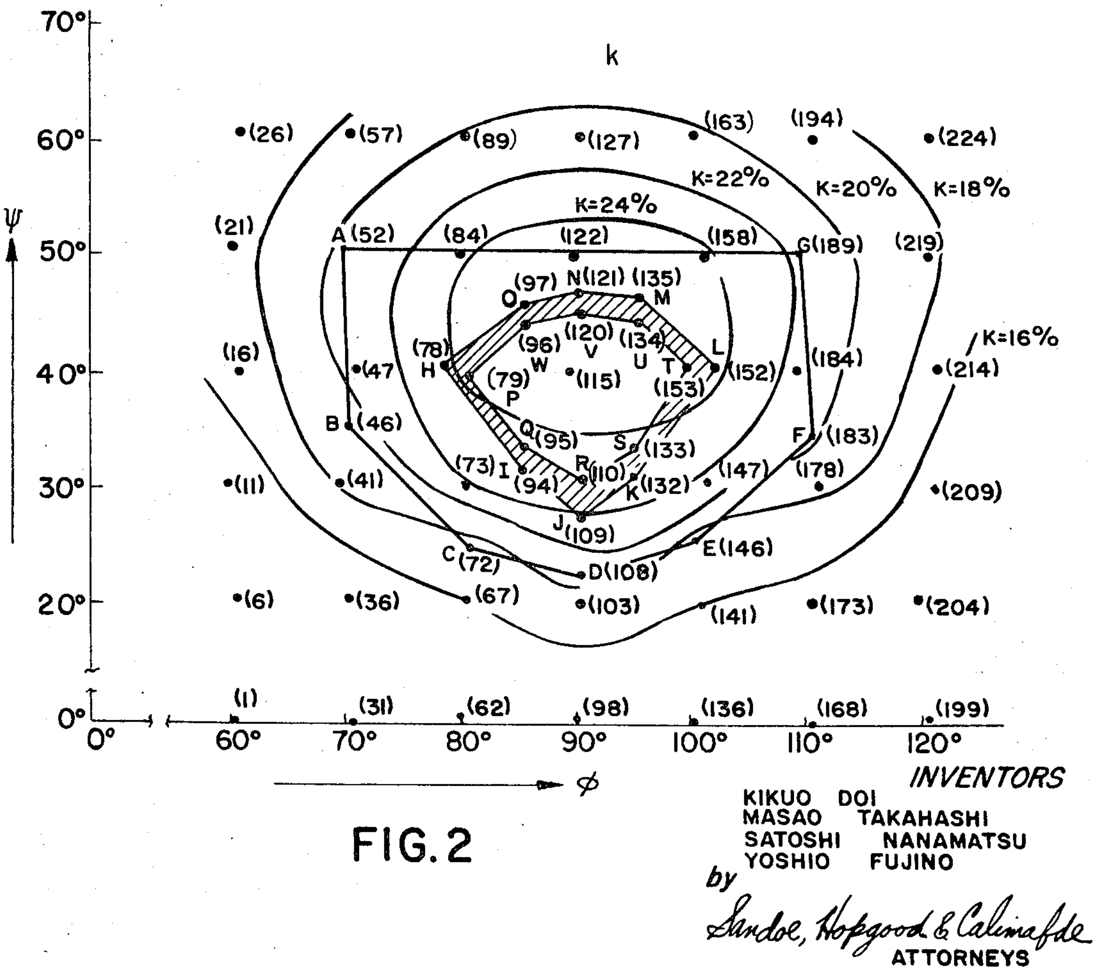
Figure 3:
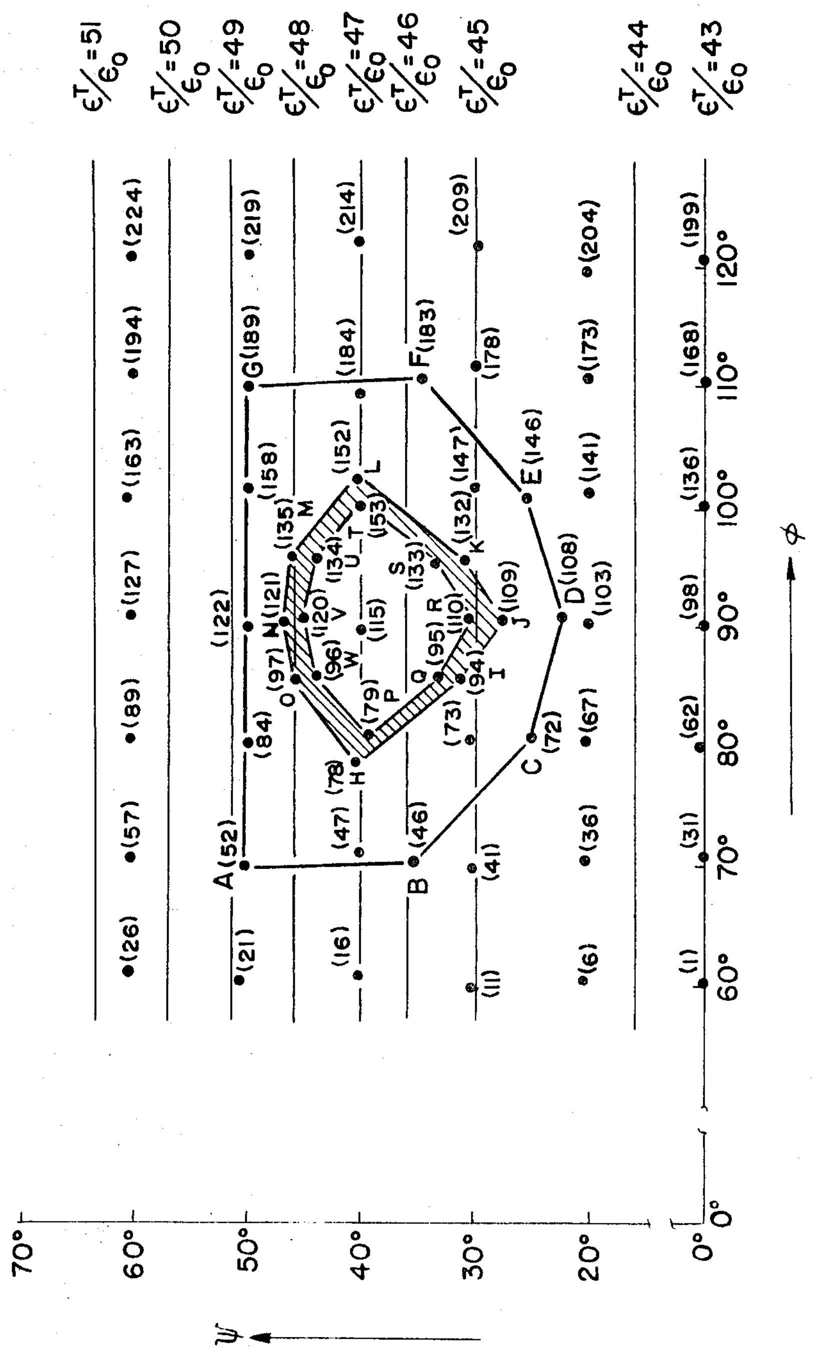
FIGS. 3,6 and 9 are graphs showing the relationship between the orientation and the specific inductive capacity of the $LiTaO_3$ crystal plates, with respect to the three angle ranges.
Figure 4:
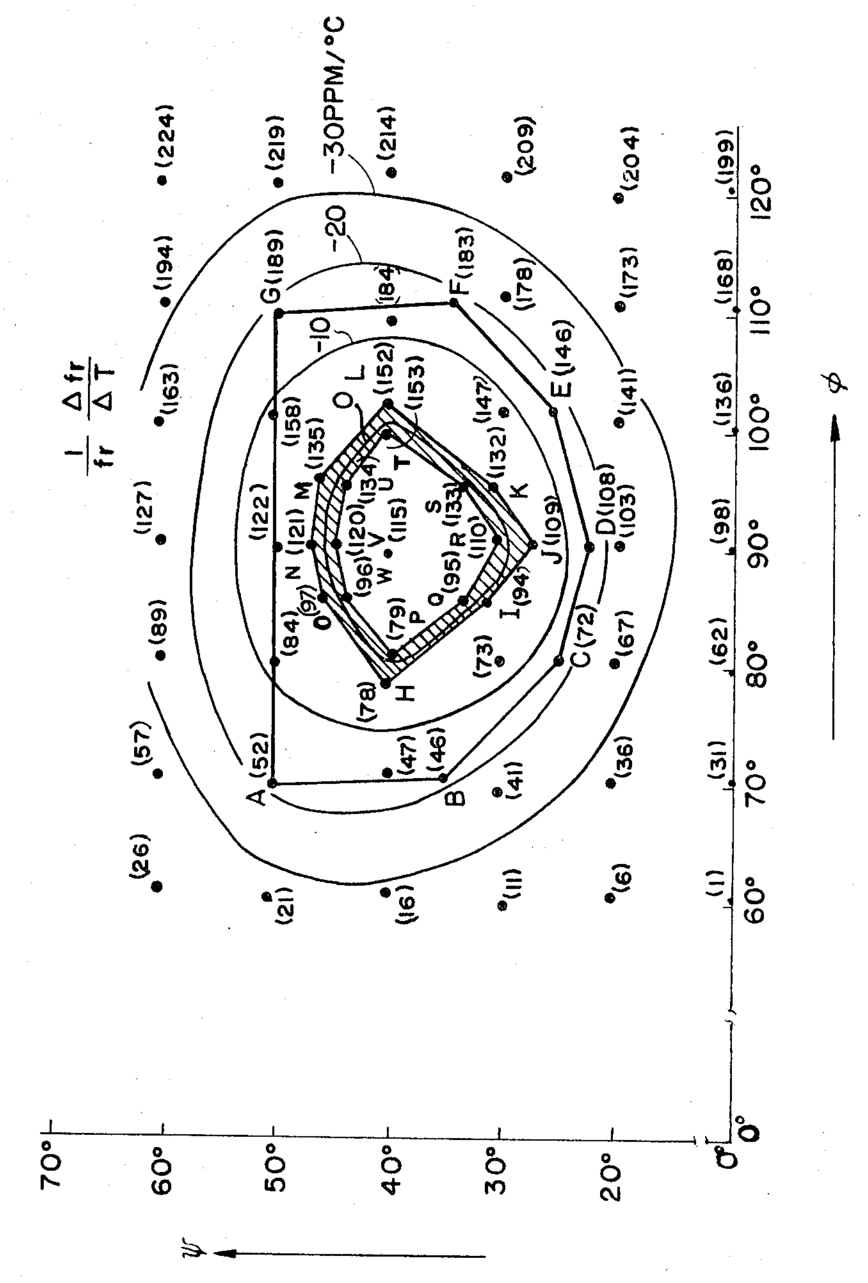
FIGS. 4,7 and 10 are graphs showing the relationship between the orientation and the resonance frequency temperature coefficient of the $LiTaO_3$ crystal plates, with respect to the three angle ranges.
Figure 5:
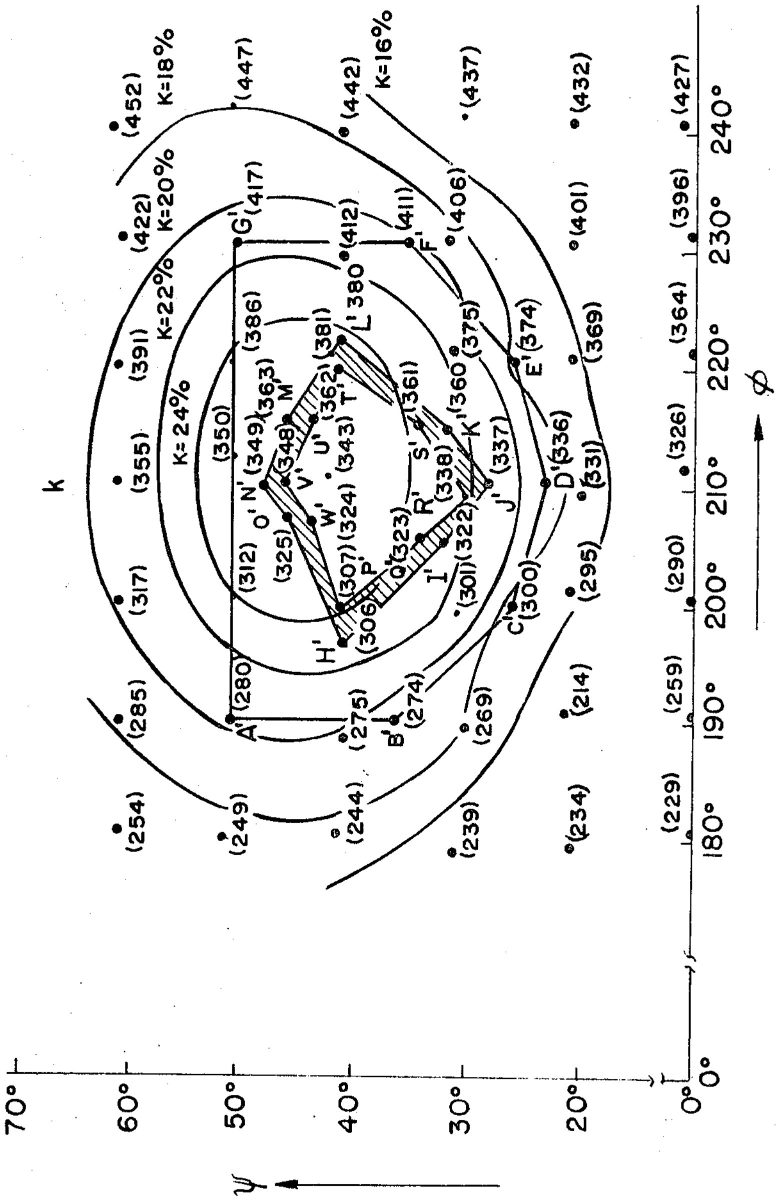
Figure 6:
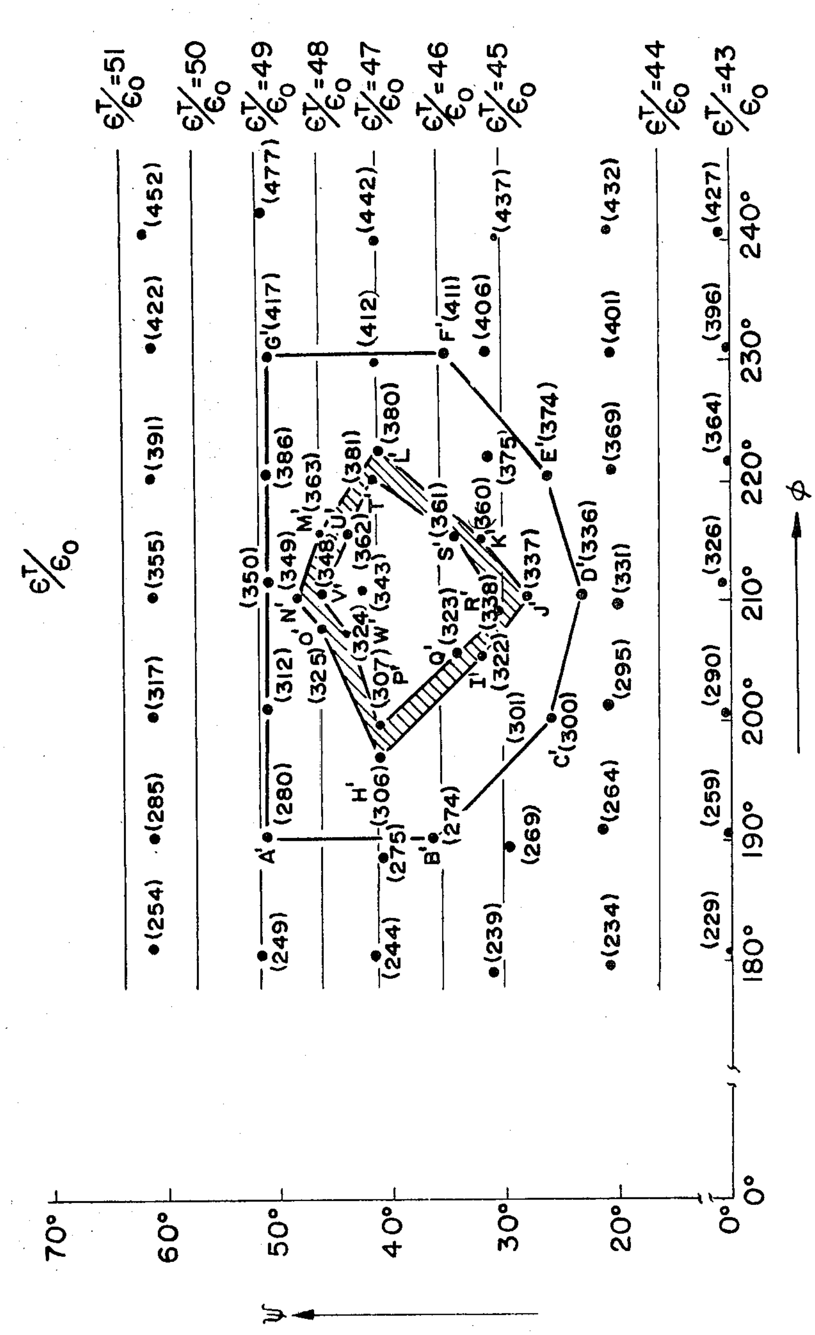
Figure 7:
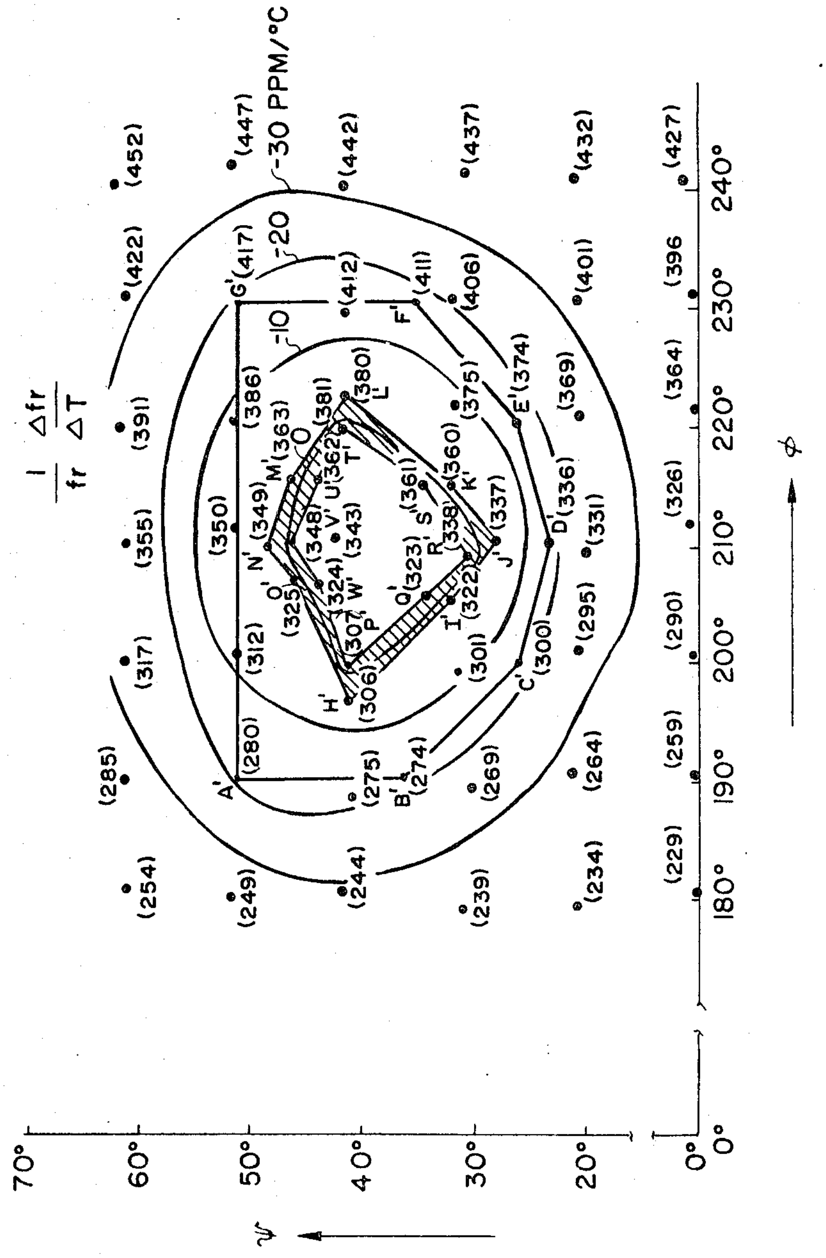
Figure 8:
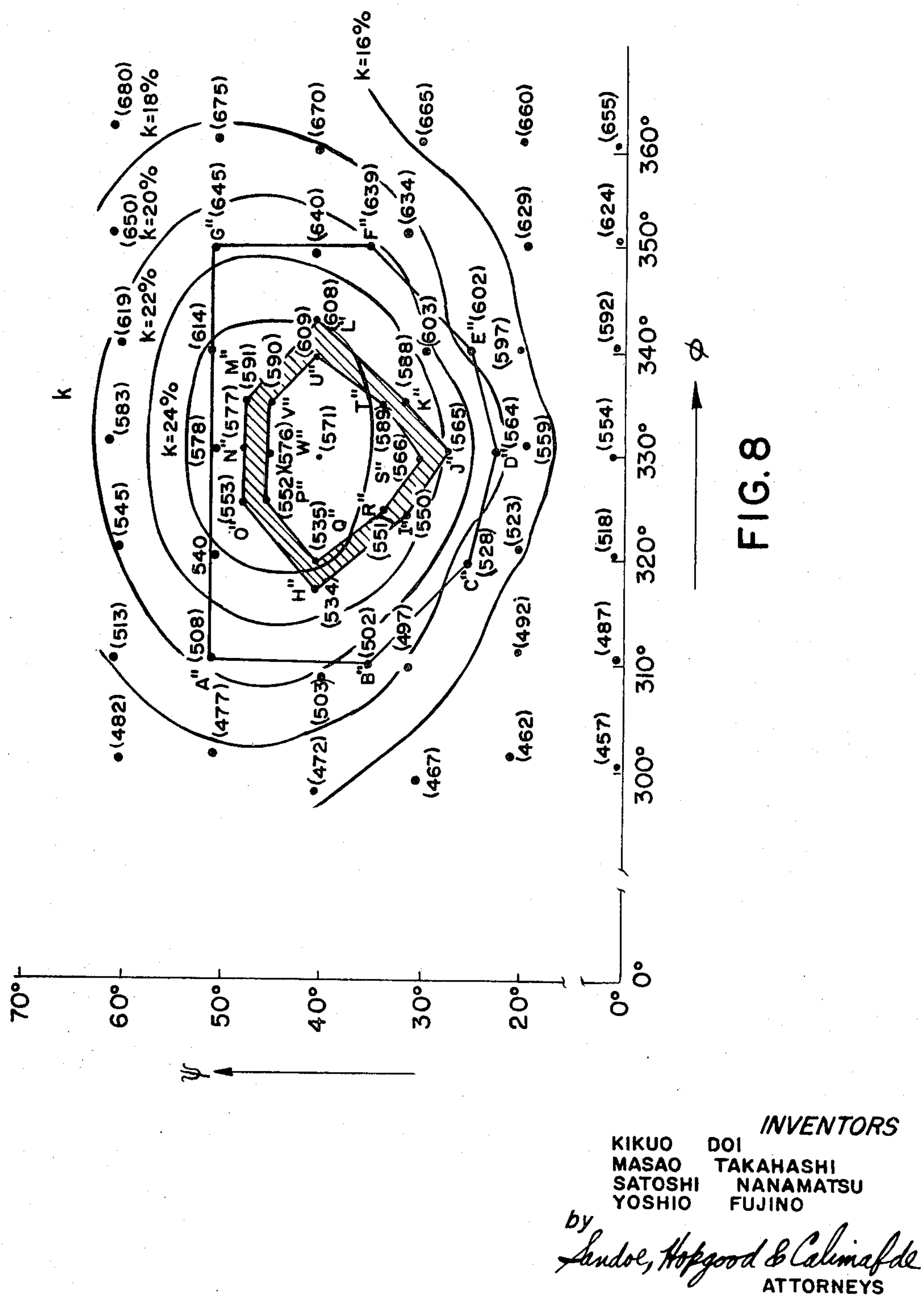
Figure 9:
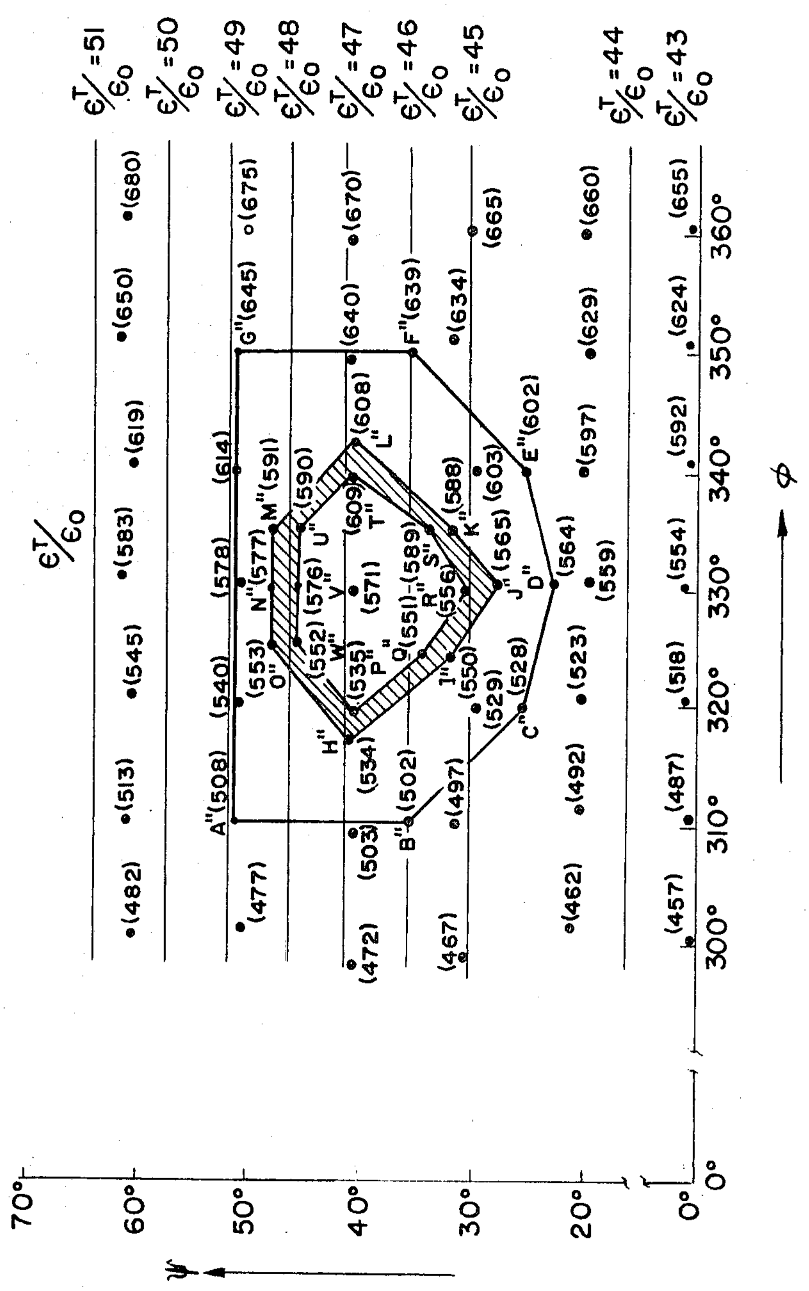
Figure 10:
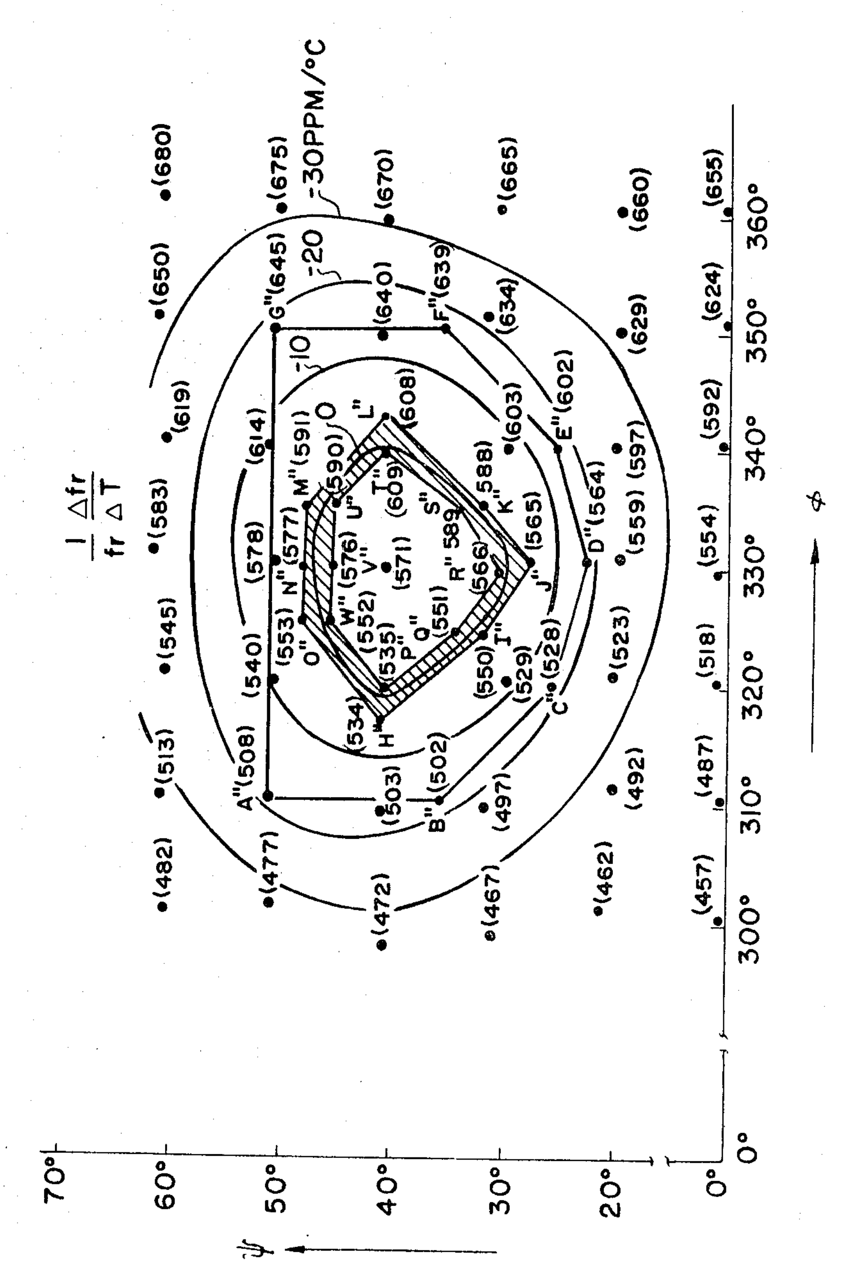

The measured values of the electromechanical coupling factor, specific inductive capacity, and the temperature coefficient for crystal resonance frequency tabulated in Table 1 are shown in graphic form in FIGS. 2, 3 and 4, respectively, for a clearer understanding thereof. Similarly, the values in Table 2 are illustrated in FIGS. 5 through 7, and those in Table 3 are illustrated in FIGS. 8 through 10. For simplicity of explanation, however, the values in the graphs of FIGS. 2 through 10 are selected from the sample plates having the angle $\theta$ near zero. The numerals in parentheses appearing in FIGS. 2 to 10 indicate the sample numbers used in Tables 1 through 3.

Correspondingly, Table 4 and FIGS. 11 and 12 show the values for the piezoelectric $LiTaO_3$ plates having the angles of $\phi$=90°$\theta$=0° and $\psi$=−45.25° ~ 59.10°. The orientation of such plates may be otherwise expressed as $(zyw)\psi$.

Because of the threefold symmetry of the $LiTaO_3$ single crystal, the piezoelectric and dielectric properties must be equal among three crystal plates having an angle $\phi_1$ between about 60° and 120° (in the group I of Table 1 and FIGS. 2 to 4), an angle $\phi_1$+120° (in the group II of Table 2 and FIGS. 5 to 7) and an angle $\phi_1$+240° (in the group III of Table 3 and FIGS. 8 to 10), respectively. This fact will be seen from comparison of values among the groups I, II and III, although few differences exist in the values and the orientations due to unavoidable errors in cutting and measuring. Since the X axis is selected arbitrarily from the three equivalent *a*-axes of the crystal, it is sufficient to define the angle $\phi$ in any one of the three groups I, II and III. For this reason, only the angle $\phi$ in the group I is defined in appended claims.

The results shown in the tables and the drawings reveal that the temperature coefficient of resonance frequency of a $LiTaO_3$ crystal plate can be made less than ±20 p.p.m./°C. and the electromechanical coupling factor thereof can exceed 10 percent in the range of $(zxtwl)$ $\phi/\psi/\theta$ orientation where $\phi$ lies within the range of 68° to 113°, $\psi$ within the range of 22° to 57° and $\theta$ within the range of 0° to 54.4° and 130.5° to 180°. In short, the piezoelectric crystal plate according to this invention has far greater piezoelectric activity than that of the quartz crystals, and the resultant piezoelectric vibrator has extensive practical utility for the proposed orientation ranges. Sample Nos. 96, 97, 135, 349, 362, 363 and so on show the electromechanical coupling factor exceeding 25 percent with the temperature coefficient being near zero.

When the angles $\phi$ and $\psi$ are within the ranges of 75° to 108° and 25° to 54°, respectively, the temperature coefficient can be less than ±10 p.p.m./°C. Further, the $LiTaO_3$ crystal plate having an orientation in the following ranges of the angles $\phi\psi$ and $\theta$ displays excellent temperature-stability.

1. The temperature coefficient of resonance frequency is less than ±20 p.p.m./°C., when the combination of the angles $\phi$ and $\psi$ lies within the polygonal area A-B-C-D-E-F-G of any of FIGS. 2 to 4 and $\theta$ lies within the range of 0° ≦ $\theta$ ≦ 50.4° or 130.5° ≦ $\theta$ ≦ 180°, the values of $\phi$ and $\psi$ at the vertices of the polygonal area being as follows:

| | $\phi$ | $\psi$ |
|---|---|---|
| A | 69.8° | 50.6° |
| B | 70.5° | 35.4° |
| C | 80.7° | 25.0° |
| D | 90.4° | 22.4° |
| E | 100.5° | 25.5° |
| F | 110.5° | 34.6° |
| G | 109.5° | 50.3° |

2. The temperature coefficient is less than ±10 p.p.m./°C., where the combination of $\phi$ and $\psi$ lies within the polygonal area H-I-J-K-L-M-N-O of any of FIGS. 2 to 4 and $\theta$ lies within the range of 0° ≦ $\theta$ ≦ 50.4° or 130.5° ≦ $\theta$ ≦ 180°, the values of $\phi$ and $\psi$ at the vertices of the polygonal area being as follows:

| | $\phi$ | $\psi$ |
|---|---|---|
| H | 78.4° | 40.5° |
| I | 85.4° | 31.5° |
| J | 90.5° | 27.5° |
| K | 95.2° | 31.2° |
| L | 102.0° | 40.5° |
| M | 95.4° | 46.5° |
| N | 90.1° | 47.0° |
| O | 84.5° | 46.0° |

3. The temperature coefficient is as small as ±1 p.p.m./°C., where the combination of $\phi$ and $\psi$ lies within the polygonal area H-I-J-K-L-M-N-O and outside another polygonal area P-Q-R-S-T-U-V-W of any of FIGS. 2 to 4 (i.e., within the area hatched in the figure) and $\theta$ lies within the range of 0° ≦ $\theta$ ≦ 50.4° and 130.5° ≦ $\theta$ ≦ 180°, the values of $\phi$ and $\psi$ at the last-mentioned area being as follows:

| | $\phi$ | $\psi$ |
|---|---|---|
| P | 80.7° | 39.5° |
| Q | 85.4° | 33.5° |
| R | 90.7° | 30.5° |
| S | 95.2° | 33.5° |
| T | 99.7° | 40.5° |
| U | 95.4° | 44.3° |
| V | 90.5° | 45.0° |
| W | 84.5° | 44.0° |

The polygonal areas A'-B'-C'-D'-E'-F'-G', H'-I'-J'-K'-L'-M'-N'-O' and P'-Q'-R'-S'-T'-U'-V'-W' of FIG. 5, 6 or 7 and those A''-B''-C''-D''-E''-F''-G'', H''-I''-J''-K''-L''-M''-N''-O'' and P''-Q''-R''-S''-T''-U''-V''-W'' of FIG. 8, 9 or 10 are almost equivalent to those of FIG. 2, 3 or 4 as defined above, respectively.

The values of the electromechanical coupling factor become higher in general as the angle $\theta$ approaches zero, particularly in the range of $\theta$ from 0° to about 1.5°.

As indicated in Table 4 and FIGS. 11 and 12, the temperature coefficient for crystal-resonant frequency is within ±10 p.p.m./°C. and the electromechanical coupling factor is more than about 20 percent in the range of 22.57° to 55.72° of the angle $\psi$, where the angles $\phi$ and $\theta$ are 90° and 0°, respectively.

TABLE 1

| No. | $\phi$ | $\psi$ | $\theta$ | $\kappa$ | $\epsilon^T/\epsilon_o$ | $\frac{1}{f_r}\frac{\Delta f_r}{\Delta T}$ |
|---|---|---|---|---|---|---|
| 1 | 60.1° | 0.2° | 0.3° | 5.9% | 43.5 | $-730.0\times10^{-6}$/°C. |
| 2 | 60.5° | 0.5° | 50.4° | 11.3 | 49.0 | −70.1 |
| 3 | 59.4° | 1.0° | 80.1° | 18.0 | 52.8 | −69.5 |
| 4 | 59.0° | 0.4° | 130.2° | 19.2 | 48.8 | −70.0 |
| 5 | 60.1° | 0.2° | 180.3° | 5.9 | 43.5 | −73.0 |
| 6 | 60.5° | 20.7° | 0.5° | 11.0 | 45.0 | −57.0 |
| 7 | 61.0° | 20.7° | 50.1° | 7.4 | 50.0 | −55.1 |
| 8 | 61.0° | 20.9° | 81.0° | 15.5 | 52.7 | −54.0 |
| 9 | 59.5° | 20.9° | 130.0° | 20.2 | 49.3 | −54.8 |
| 10 | 60.5° | 20.7° | 180.5° | 11.0 | 45.0 | −57.0 |
| 11 | 59.7° | 30.4° | 0.5° | 13.5 | 46.0 | −45.0 |
| 12 | 60.5° | 30.5° | 50.2° | 3.4 | 49.9 | −45.1 |
| 13 | 61.0° | 30.5° | 80.7° | 12.6 | 53.0 | −43.1 |
| 14 | 61.0° | 30.7° | 131.0° | 20.5 | 50.5 | −40.2 |
| 15 | 59.7° | 30.4° | 180.5° | 13.5 | 46.0 | −45.0 |
| 16 | 60.8° | 40.2° | 0.2° | 17.0 | 47.5 | −32.0 |
| 17 | 58.0° | 40.9° | 51.0° | 2.0 | 50.5 | −32.5 |
| 18 | 58.5° | 40.9° | 80.3° | 9.0 | 52.8 | −31.6 |
| 19 | 60.0° | 40.1° | 131.5° | 19.9 | 51.0 | −33.0 |
| 20 | 60.8° | 40.2° | 180.2° | 17.0 | 47.5 | −32.0 |
| 21 | 60.2° | 50.8° | 1.0° | 17.5 | 49.0 | −31.0 |
| 22 | 58.5° | 50.8° | 51.5° | 4.7 | 52.0 | −30.5 |

| | | | | | | |
|---|---|---|---|---|---|---|
| 23 | 59.0° | 50.2° | 80.4° | 5.3 | 52.9 | −30.6 |
| 24 | 61.0° | 50.2° | 129.7° | 18.0 | 51.2 | −31.7 |
| 25 | 60.2° | 50.8° | 181.0° | 17.5 | 49.0 | −31.0 |
| 26 | 61.1° | 60.5° | 0.4° | 16.5 | 51.0 | −41.0 |
| 27 | 61.1° | 60.5° | 50.4° | 6.6 | 52.0 | −39.2 |
| 28 | 60.5° | 60.5° | 80.5° | 3.0 | 53.0 | −38.0 |
| 29 | 59.5° | 60.7° | 130.0° | 13.5 | 51.9 | −39.5 |
| 30 | 61.1° | 60.5° | 180.4° | 16.5 | 51.0 | −41.0 |
| 31 | 70.5° | 0.1° | 0.3° | 6.5 | 43.0 | −69.0 |
| 32 | 71.0° | 0.1° | 50.4° | 9.2 | 48.0 | −70.8 |
| 33 | 71.0° | 0.5° | 80.1° | 15.0 | 52.7 | −69.0 |
| 34 | 72.0° | 0.5° | 130.0° | 17.0 | 49.0 | −71.0 |
| 35 | 70.5° | 0.1° | 180.3° | 6.5 | 43.0 | −69.0 |
| 36 | 70.2° | 20.5° | 0.5° | 10.6 | 44.4 | −41.0 |
| 37 | 69.0° | 20.5° | 51.0° | 3.0 | 49.5 | −38.5 |
| 38 | 69.0° | 20.5° | 81.0° | 12.5 | 53.1 | −38.0 |
| 39 | 70.0° | 21.0° | 131.5° | 20.5 | 49.3 | −39.0 |
| 40 | 70.2° | 20.5° | 180.5° | 10.6 | 44.4 | −41.0 |
| 41 | 69.5° | 30.4° | 0.5° | 18.0 | 46.0 | −23.5 |
| 42 | 71.0° | 30.4° | 50.5° | 0.7 | 49.9 | −22.0 |
| 43 | 71.0° | 30.5° | 80.5° | 10.0 | 53.5 | −21.0 |
| 44 | 71.5° | 30.5° | 130.4° | 21.0 | 51.5 | −23.0 |
| 45 | 69.5° | 30.4° | 180.5° | 18.0 | 46.0 | −23.5 |
| 46 | 70.5° | 35.4° | 0.5° | 19.0 | 46.5 | −19.5 |
| 47 | 70.8° | 40.1° | 0.4° | 21.0 | 47.5 | −15.0 |
| 48 | 71.0° | 40.1° | 50.3° | 5.0 | 51.0 | −13.5 |
| 49 | 69.0° | 41.3° | 80.0° | 6.5 | 52.8 | −13.0 |
| 50 | 69.0° | 41.3° | 130.1° | 21.5 | 50.5 | −14.0 |
| 51 | 70.8° | 40.1° | 180.4° | 21.0 | 47.5 | −15.0 |
| 52 | 69.8° | 50.6° | 0.3° | 20.5 | 49.0 | −19.5 |
| 53 | 70.0° | 51.0° | 50.1° | 8.0 | 51.5 | −17.5 |
| 54 | 71.0° | 51.0° | 80.7° | 3.7 | 53.2 | −18.0 |
| 55 | 71.0° | 50.5° | 130.9° | 19.5 | 51.2 | −19.0 |
| 56 | 69.8° | 50.6° | 180.3° | 20.5 | 49.0 | −19.5 |
| 57 | 70.5° | 60.5° | 0.4° | 18.5 | 51.5 | −33.0 |
| 58 | 71.0° | 60.5° | 50.5° | 8.6 | 52.5 | −32.0 |
| 59 | 71.0° | 61.5° | 80.1° | 1.0 | 52.9 | −33.0 |
| 60 | 70.5° | 60.1° | 130.5° | 15.5 | 51.9 | −32.0 |
| 61 | 70.5° | 60.5° | 180.4° | 18.5 | 51.5 | −33.0 |
| 62 | 80.1° | 0.5° | 0.1° | 6.3 | 44.5 | −74.0 |
| 63 | 80.5° | 1.0° | 50.4° | 3.6 | 49.5 | −70.0 |
| 64 | 80.5° | 1.0° | 80.2° | 8.1 | 53.0 | −69.0 |
| 65 | 79.5° | 0.3° | 130.8° | 11.0 | 48.8 | −71.0 |
| 66 | 80.1° | 0.5° | 180.1° | 6.3 | 44.5 | − 74.0 |
| 67 | 80.5° | 20.3° | 0.4° | 16.0 | 44.6 | −27.5 |
| 68 | 81.0° | 20.4° | 50.3° | 2.9 | 49.0 | −27.0 |
| 69 | 81.0° | 20.5° | 80.3° | 6.2 | 52.9 | −26.0 |
| 70 | 81.5° | 20.5° | 130.4° | 17.3 | 49.3 | −28.0 |
| 71 | 80.5° | 20.3° | 180.4° | 16.0 | 44.6 | −27.5 |
| 72 | 80.7° | 25.0° | 0.4° | 17.5 | 45.0 | −18.0 |
| 73 | 80.4° | 30.5° | 0.6° | 22.0 | 46.0 | −7.0 |
| 74 | 81.0° | 30.5° | 50.9° | 7.0 | 49.9 | −6.0 |
| 75 | 81.2° | 30.7° | 80.7° | 4.2 | 53.1 | −7.0 |
| 76 | 81.0° | | 130.5° | 19.0 | 50.5 | −7.5 |
| 77 | 80.4° | 30.5° | 180.6° | 22.0 | 46.0 | −7.0 |
| 78 | 78.4° | 40.5° | 0.6° | 23.0 | 47.5 | −0.8 |
| 79 | 80.7° | 39.5° | 0.4° | 24.5 | 47.3 | 0.7 |
| 80 | 81.5° | 40.5° | 50.2° | 10.5 | 50.5 | 1.0 |
| 81 | 81.0° | 39.2° | 80.0° | 2.0 | 53.1 | 1.0 |
| 82 | 81.0° | 40.1° | 130.4° | 20.3 | 51.0 | 0.5 |
| 83 | 80.7° | 39.5° | 180.4° | 24.5 | 47.3 | 0.7 |
| 84 | 80.1° | 50.1° | 0.8° | 24.0 | 49.0 | −7.1 |
| 85 | 81.0° | 50.5° | 50.8° | 12.0 | 52.0 | −8.0 |
| 86 | 81.0° | 50.4° | 80.0° | 0.1 | 52.8 | −9.0 |
| 87 | 80.5° | 50.4° | 130.1° | 18.0 | 51.2 | −7.0 |
| 88 | 80.1° | 50.1° | 180.8° | 24.0 | 49.0 | −9.1 |
| 89 | 80.4° | 60.3° | 0.5° | 20.0 | 51.0 | −28.0 |
| 90 | 79.5° | 60.5° | 50.1° | 10.5 | 52.0 | −27.0 |
| 91 | 79.5° | 61.0° | 79.5° | 1.0 | 53.2 | −28.0 |
| 92 | 81.0° | 61.0° | 129.5° | 15.0 | 51.9 | −29.0 |
| 93 | 80.4° | 60.3° | 180.5° | 20.0 | 51.0 | −28.0 |
| 94 | 85.4° | 31.5° | 0.5° | 22.0 | 46.0 | −0.9 |
| 95 | 85.4° | 33.5° | 0.5° | 22.5 | 46.5 | 0.8 |
| 96 | 84.5° | 44.0° | 1.0° | 25.0 | 48.0 | 0.5 |
| 97 | 84.5° | 46.0° | 1.0° | 25.2 | 48.5 | −0.7 |
| 98 | 90.2° | 0.4° | 0.4° | 6.0 | 43.5 | −74.0 |
| 99 | 91.0° | 1.0° | 50.2° | 3.9 | 49.2 | −71.0 |
| 100 | 91.0° | 1.0° | 79.6° | 1.0 | 53.1 | −69.0 |
| 101 | 89.4° | 1.5° | 129.3° | 3.9 | 48.8 | −70.4 |
| 102 | 90.2° | 0.4° | 180.4° | 6.0 | 43.5 | −74.0 |
| 103 | 90.5° | 20.1° | 0.5° | 17.1 | 45.0 | −23.4 |
| 104 | 91.0° | 20.4° | 50.1° | 10.2 | 49.5 | −21.0 |
| 105 | 89.5° | 19.5° | 79.5° | 2.5 | 52.9 | −22.5 |
| 106 | 89.4° | 20.5° | 130.4° | 10.8 | 49.3 | −23.0 |
| 107 | 90.5° | 20.1° | 180.5° | 17.1 | 45.0 | −23.4 |
| 108 | 90.4° | 22.4° | 0.4° | 19.0 | 44.2 | −14.0 |
| 109 | 90.5° | 27.5° | 0.5° | 22.5 | 44.5 | −0.8 |
| 110 | 90.7° | 30.5° | 0.4° | 23.0 | 46.1 | 1.0 |
| 111 | 91.0° | 31.0° | 49.8° | 14.0 | 50.0 | 0.8 |
| 112 | 91.0° | 31.0° | 80.1° | 3.0 | 53.1 | 0.7 |
| 113 | 89.5° | 30.4° | 130.0° | 13.5 | 49.9 | 0.7 |
| 114 | 90.7° | 30.5° | 180.4° | 23.0 | 46.1 | 1.0 |
| 115 | 89.5° | 40.1° | 0.3° | 26.0 | 47.5 | 6.0 |
| 116 | 90.5° | 40.1° | 49.2° | 15.5 | 50.5 | 6.0 |
| 117 | 90.5° | 40.5° | 80.1° | 4.0 | 52.8 | 7.0 |
| 118 | 91.0° | 39.5° | 130.5° | 16.2 | 51.0 | 5.5 |
| 119 | 89.5° | 40.1° | 180.3° | 26.0 | 47.5 | 6.0 |
| 120 | 90.5° | 45.0° | 0.5° | 25.0 | 48.0 | 1.0 |
| 121 | 90.1° | 47.0° | 0.5° | 24.0 | 49.0 | −0.9 |
| 122 | 89.7° | 50.1° | 0.4° | 25.6 | 48.8 | −4.6 |
| 123 | 89.7° | 51.0° | 49.1° | 16.1 | 51.2 | −4.5 |
| 124 | 89.7° | 50.3° | 80.5° | 4.2 | 53.0 | −5.0 |
| 125 | 89.7° | 50.1° | 130.5° | 16.1 | 52.0 | −5.6 |
| 126 | 89.7° | 50.1° | 180.4° | 25.6 | 48.8 | −4.6 |
| 127 | 90.5° | 60.5° | 0.1° | 21.0 | 51.0 | −26.0 |
| 128 | 91.0° | 61.0° | 50.2° | 13.5 | 52.0 | −25.0 |
| 129 | 91.0° | 61.0° | 79.8° | 3.5 | 53.0 | −27.0 |
| 130 | 89.1° | 59.8° | 130.2° | 13.6 | 51.9 | −26.5 |
| 131 | 90.5° | 60.5° | 180.1° | 21.0 | 51.0 | −26.0 |
| 132 | 95.2° | 31.2° | 0.5° | 23.0 | 45.2 | −1.0 |
| 133 | 95.2° | 33.5° | 0.5° | 24.5 | 45.5 | 0.9 |
| 134 | 95.4° | 44.3° | 0.6° | 25.5 | 48.5 | 1.0 |
| 135 | 95.4° | 46.5° | 0.6° | 25.0 | 49.5 | −0.8 |
| 136 | 100.5° | 0.3° | 0.1° | 6.0 | 43.5 | −67.0 |
| 137 | 101.0° | 1.0° | 50.1° | 11.0 | 49.0 | −70.0 |
| 138 | 101.0° | 0.5° | 79.1° | 10.5 | 52.5 | −71.0 |
| 139 | 101.5° | 0.5° | 130.5° | 3.5 | 48.9 | −69.0 |
| 140 | 100.5° | 0.3° | 180.1° | 6.0 | 43.5 | −67.0 |
| 141 | 101.0° | 20.1° | 1.0° | 16.0 | 44.3 | −27.5 |
| 142 | 100.5° | 20.5° | 50.3° | 17.0 | 49.3 | −27.0 |
| 143 | 100.3° | 20.7° | 79.9° | 11.5 | 52.7 | −27.0 |
| 144 | 100.5° | 20.5° | 129.3° | 2.5 | 49.5 | −29.0 |
| 145 | 101.0° | 20.1° | 181.0° | 16.0 | 44.3 | −27.5 |
| 146 | 100.5° | 25.5° | 1.0° | 18.5 | 45.0 | −17.5 |
| 147 | 101.5° | 30.4° | 1.1° | 21.5 | 46.2 | −7.5 |
| 148 | 100.5° | 31.0° | 49.3° | 18.5 | 49.9 | −7.0 |
| 149 | 100.5° | 31.0° | 79.1° | 11.0 | 53.5 | −9.0 |
| 150 | 100.5° | 30.5° | 130.0° | 7.1 | 50.5 | −5.0 |
| 151 | 101.5° | 30.4° | 181.1° | 21.5 | 46.2 | −7.5 |
| 152 | 102.0° | 40.5° | 1.0° | 24.1 | 46.5 | −0.8 |
| 153 | 99.7° | 40.5° | 1.0° | 24.8 | 47.1 | 0.6 |
| 154 | 100.5° | 40.5° | 49.1° | 20.3 | 51.0 | 1.0 |
| 155 | 100.2° | 39.3° | 79.5° | 10.0 | 52.8 | 0.9 |
| 156 | 100.5° | 39.3° | 130.1° | 10.5 | 50.5 | 0.5 |
| 157 | 99.7° | 40.5° | 181.0° | 24.8 | 47.1 | 0.6 |
| 158 | 101.1° | 50.1° | 1.5° | 24.5 | 49.2 | −8.5 |
| 159 | 101.1° | 50.2° | 49.1° | 18.2 | 51.2 | −8.0 |
| 160 | 101.1° | 50.5° | 80.5° | 8.4 | 52.8 | −8.3 |
| 161 | 101.5° | 50.5° | 130.4° | 12.0 | 51.2 | −7.0 |
| 162 | 101.1° | 50.1° | 181.5° | 24.5 | 49.2 | −8.5 |
| 163 | 100.4° | 60.7° | 0.3° | 20.5 | 51.0 | −28.5 |
| 164 | 99.5° | 60.5° | 49.2° | 15.0 | 52.5 | −29.0 |
| 165 | 99.5° | 60.5° | 79.1° | 6.0 | 53.5 | −31.0 |
| 166 | 101.0° | 59.1° | 131.5° | 11.0 | 51.9 | −26.0 |
| 167 | 100.4° | 60.7° | 180.3° | 20.5 | 51.0 | −28.5 |
| 168 | 110.5° | 0.0° | 0.1° | 6.0 | 43.2 | −73.0 |
| 169 | 109.5° | 1.0° | 50.3° | 16.5 | 49.0 | −71.0 |
| 170 | 109.5° | 0.5° | 79.9° | 17.0 | 52.0 | −72.0 |
| 171 | 109.7° | 0.5° | 129.1° | 9.2 | 48.8 | −68.0 |
| 172 | 110.5° | 0.0° | 180.1° | 6.0 | 43.2 | −73.0 |
| 173 | 110.7° | 20.3° | 1.1° | 13.5 | 44.0 | −40.5 |

| | | | | | | |
|---|---|---|---|---|---|---|
| 174 | 109.5° | 20.5° | 50.2° | 20.5 | 49.3 | −39.0 |
| 175 | 110.5° | 21.5° | 79.3° | 17.2 | 52.7 | −37.0 |
| 176 | 110.5° | 21.0° | 130.1° | 3.7 | 49.5 | −41.0 |
| 177 | 110.7° | 20.3° | 181.1° | 13.5 | 44.0 | −40.5 |
| 178 | 111.3° | 30.1° | 1.5° | 18.2 | 46.0 | −23.5 |
| 179 | 110.5° | 29.5° | 50.3° | 21.7 | 49.9 | −20.0 |
| 180 | 110.5° | 29.5° | 79.5° | 16.1 | 52.7 | −21.0 |
| 181 | 110.6° | 29.5° | 131.5° | 1.0 | 50.1 | −24.0 |
| 182 | 111.3° | 30.1° | 181.5° | 18.2 | 46.0 | −23.5 |
| 183 | 110.5° | 34.6° | 1.0° | 20.5 | 46.5 | −18.0 |
| 184 | 108.9° | 40.1° | 1.3° | 21.0 | 47.3 | −14.5 |
| 185 | 109.5° | 40.5° | 49.8° | 21.6 | 51.2 | −12.0 |
| 186 | 109.5° | 40.3° | 78.7° | 14.0 | 52.8 | −10.0 |
| 187 | 110.2° | 40.3° | 130.4° | 5.0 | 50.5 | −14.0 |
| 188 | 108.9° | 40.1° | 181.3° | 21.0 | 47.3 | −14.5 |
| 189 | 109.5° | 50.3° | 0.9° | 21.8 | 48.8 | −18.2 |
| 190 | 109.5° | 50.4° | 50.3° | 18.5 | 51.0 | −18.2 |
| 191 | 110.0° | 50.5° | 80.1° | 10.5 | 52.8 | −17.0 |
| 192 | 110.0° | 50.5° | 130.5° | 7.9 | 51.2 | −20.0 |
| 193 | 109.5° | 50.3° | 180.9° | 21.8 | 48.8 | −18.2 |
| 194 | 110.4° | 60.2° | 0.3° | 19.0 | 51.2 | −32.5 |
| 195 | 110.4° | 60.3° | 50.4° | 15.5 | 51.9 | −32.0 |
| 196 | 110.5° | 59.4° | 81.0° | 7.5 | 53.7 | −33.0 |
| 197 | 110.5° | 59.4° | 130.3° | 8.6 | 51.9 | −35.0 |
| 198 | 110.4° | 60.2° | 180.3° | 19.0 | 51.2 | −32.5 |
| 199 | 120.5° | 0.5° | 0.4° | 6.5 | 43.5 | −69.0 |
| 200 | 121.5° | 1.0° | 49.1° | 19.2 | 49.7 | −69.0 |
| 201 | 119.5° | 0.1° | 79.5° | 19.5 | 52.7 | −72.0 |
| 202 | 119.5° | 0.1° | 129.5° | 11.2 | 48.8 | −70.0 |
| 203 | 120.5° | 0.5° | 180.4° | 6.5 | 43.5 | −69.0 |
| 204 | 119.5° | 20.5° | 0.7° | 10.0 | 44.3 | −57.5 |
| 205 | 120.5° | 20.6° | 49.3° | 19.5 | 49.3 | −54.0 |
| 206 | 120.6° | 20.8° | 78.9° | 18.0 | 52.7 | −56.0 |
| 207 | 120.5° | 20.8° | 129.4° | 7.4 | 49.5 | −57.0 |
| 208 | 119.5° | 20.5° | 180.7° | 10.0 | 44.3 | −57.5 |
| 209 | 121.0° | 30.1° | 0.9° | 13.8 | 45.5 | −42.5 |
| 210 | 121.0° | 30.5° | 49.5° | 20.3 | 51.0 | −40.0 |
| 211 | 121.0° | 31.0° | 81.0° | 17.0 | 54.0 | −41.5 |
| 212 | 121.0° | 31.0° | 129.5° | 3.0 | 49.9 | −45.0 |
| 213 | 121.0° | 30.1° | 180.9° | 13.8 | 45.5 | −42.5 |
| 214 | 121.5° | 40.5° | 1.1° | 16.5 | 47.7 | −32.6 |
| 215 | 120.0° | 40.6° | 50.5° | 18.5 | 51.0 | −31.1 |
| 216 | 120.3° | 41.2° | 81.1° | 14.6 | 52.8 | −29.0 |
| 217 | 120.5° | 41.2° | 130.0° | 11.0 | 50.5 | −34.0 |
| 218 | 121.5° | 40.5° | 181.1° | 16.5 | 47.7 | −32.6 |
| 219 | 120.7° | 50.1° | 1.0° | 18.1 | 49.0 | −31.0 |
| 220 | 120.5° | 50.4° | 50.4° | 18.0 | 51.5 | −29.0 |
| 221 | 120.5° | 50.4° | 80.3° | 11.0 | 52.8 | −33.0 |
| 222 | 120.5° | 49.3° | 130.5° | 4.5 | 51.2 | −32.0 |
| 223 | 120.7° | 50.1° | 181.0° | 18.1 | 49.0 | −31.0 |
| 224 | 120.5° | 60.5° | 0.5° | 16.5 | 51.0 | −39.5 |
| 225 | 120.4° | 60.5° | 50.1° | 14.5 | 52.5 | −38.0 |
| 226 | 121.5° | 60.1° | 79.5° | 7.8 | 52.9 | −37.0 |
| 227 | 121.5° | 60.1° | 128.9° | 6.6 | 51.9 | −41.0 |
| 228 | 120.5° | 60.5° | 180.5° | 16.5 | 51.0 | −39.5 |

TABLE 2

| No. | φ | ψ | θ | κ (%) | εT/ε₀ | $\frac{1}{f_r}\frac{\Delta f_r}{\Delta T}$ (×10⁻⁶/° C.) |
|---|---|---|---|---|---|---|
| 229 | 180.5° | 0.2° | 0.3° | 6.6 | 43.0 | −70.5 |
| 230 | '181.0° | 1.0° | 50.4° | 11.3 | 48.9 | −69.0 |
| 231 | 181.0° | 0.5° | 80.3° | 17.8 | 52.7 | −67.0 |
| 232 | 179.5° | 0.5° | 130.2° | 19.2 | 49.0 | −72.0 |
| 233 | 180.5° | 0.2° | 180.3° | 6.6 | 43.0 | −70.5 |
| 234 | 179.5° | 20.4° | 0.5° | 10.0 | 44.3 | −57.0 |
| 235 | 180.5° | 20.5° | 49.1° | 7.4 | 49.8 | −53.0 |
| 236 | 180.4° | 20.9° | 81.0° | 15.2 | 52.7 | −52.0 |
| 237 | 179.6° | 20.9° | 131.0° | 20.0 | 49.4 | −56.0 |
| 238 | 179.5° | 20.4° | 180.5° | 10.0 | 44.3 | −57.0 |
| 239 | 179.2° | 30.5° | 0.4° | 13.5 | 46.1 | −42.8 |
| 240 | 179.5° | 30.5° | 49.3° | 3.2 | 49.5 | −40.5 |
| 241 | 179.4° | 31.0° | 79.5° | 12.5 | 53.0 | − 43.0 |
| 242 | 179.4° | 31.0° | 131.4° | 20.4 | 50.5 | −42.0 |
| 243 | 179.2° | 30.5° | 180.4° | 13.5 | 46.1 | −42.8 |
| 244 | 180.7° | 41.0° | 1.0° | 16.3 | 47.4 | −32.7 |
| 245 | 180.5° | 41.0° | 50.3° | 1.0 | 50.6 | −35.0 |
| 246 | 180.5° | 40.1° | 80.4° | 9.1 | 53.2 | −37.0 |
| 247 | 179.5° | 40.5° | 130.5° | 19.5 | 50.6 | −29.5 |
| 248 | 180.7° | 41.0° | 181.0° | 16.3 | 47.4 | −32.7 |
| 249 | 180.4° | 51.0° | 1.5° | 18.0 | 49.0 | −31.5 |
| 250 | 180.5° | 52.0° | 49.8° | 4.5 | 53.0 | −30.5 |
| 251 | 181.0° | 50.3° | 78.5° | 5.3 | 54.0 | −33.5 |
| 252 | 181.0° | 50.3° | 129.5° | 18.0 | 51.3 | −29.0 |
| 253 | 180.4° | 51.0° | 181.5° | 18.0 | 49.0 | −31.5 |
| 254 | 181.2° | 60.5° | 1.0° | 16.5 | 51.0 | −40.0 |
| 255 | 181.2° | 60.5° | 50.2° | 6.6 | 52.0 | −39.2 |
| 256 | 180.5° | 60.1° | 80.5° | 2.2 | 52.9 | −45.0 |
| 257 | 180.0° | 60.1° | 130.4° | 14.6 | 52.5 | −41.0 |
| 258 | 181.2° | 60.5° | 181.0° | 16.5 | 51.0 | −40.0 |
| 259 | 190.5° | 0.5° | 1.0° | 6.2 | 43.0 | −71.0 |
| 260 | 189.5° | 1.0° | 50.3° | 17.0 | 49.0 | − 67.0 |
| 261 | 189.5° | 0.4° | 80.5° | 17.4 | 52.5 | −74.0 |
| 262 | 189.7° | 0.4° | 130.1° | 9.2 | 48.9 | −75.0 |
| 263 | 190.5° | 0.5° | 181.0° | 6.2 | 43.0 | −71.0 |
| 264 | 191.0° | 20.9° | 1.5° | 12.0 | 44.7 | −39.5 |
| 265 | 190.5° | 21.0° | 49.3° | 3.2 | 49.4 | −41.0 |
| 266 | 190.4° | 20.5° | 79.3° | 12.5 | 53.2 | −42.0 |
| 267 | 190.4° | 20.5° | 131.5° | 20.5 | 49.4 | −39.0 |
| 268 | 191.0° | 20.9° | 181.5° | 12.0 | 44.7 | −39.5 |
| 269 | 189.5° | 29.5° | 1.8° | 17.2 | 46.0 | −23.2 |
| 270 | 190.0° | 29.6° | 50.5° | 0.7 | 51.0 | −21.5 |
| 271 | 190.5° | 28.9° | 78.5° | 10.2 | 52.3 | −25.0 |
| 272 | 190.5° | 30.1° | 130.8° | 21.0 | 49.9 | −27.5 |
| 273 | 189.5° | 29.5° | 181.8° | 17.2 | 46.0 | −23.2 |
| 274 | 190.5° | 35.6° | 0.5° | 18.5 | 46.5 | −19.5 |
| 275 | 188.7° | 40.1° | 0.3° | 21.2 | 49.2 | −14.5 |
| 276 | 189.5° | 40.5° | 50.9° | 5.0 | 50.7 | −14.0 |
| 277 | 189.5° | 40.7° | 80.9° | 6.9 | 52.8 | −19.0 |
| 278 | 190.5° | 40.7° | 130.5° | 21.6 | 50.6 | −15.5 |
| 279 | 188.7° | 40.1° | 180.3° | 21.2 | 49.2 | −14.5 |
| 280 | 190.3° | 50.5° | 0.5° | 21.5 | 49.0 | −18.0 |
| 281 | 190.0° | 50.5° | 50.8° | 7.9 | 52.0 | −20.5 |
| 282 | 190.0° | 50.9° | 80.5° | 4.0 | 52.9 | −21.5 |
| 283 | 190.5° | 51.3° | 130.1° | 19.5 | 51.3 | −19.0 |
| 284 | 190.3° | 50.5° | 180.5° | 21.5 | 49.0 | −18.0 |
| 285 | 190.3° | 60.4° | 0.0° | 18.3 | 51.0 | −32.8 |
| 286 | 190.5° | 60.5° | 50.8° | 8.7 | 52.0 | −30.0 |
| 287 | 190.5° | 60.9° | 80.4° | 1.0 | 53.1 | −34.0 |
| 288 | 191.0° | 60.9° | 130.5° | 15.5 | 52.5 | −35.5 |
| 289 | 190.3° | 60.4° | 180.0° | 18.3 | 51.0 | −32.8 |
| 290 | 200.4° | 0.5° | 1.0° | 5.5 | 43.2 | −72.5 |
| 291 | 200.4° | 0.5° | 51.0° | 11.5 | 49.3 | −69.0 |
| 292 | 199.5° | 0.9° | 82.0° | 10.5 | 52.9 | −74.0 |
| 293 | 199.5° | 1.0° | 131.0° | 3.7 | 48.9 | −75.0 |
| 294 | 200.4° | 0.5° | 181.0° | 5.5 | 43.2 | −72.5 |
| 295 | 201.3° | 20.4° | 1.5° | 16.1 | 44.5 | −27.6 |
| 296 | 200.5° | 20.5° | 51.0° | 3.0 | 49.5 | −25.0 |
| 297 | ' 200.4° | 20.3° | 79.8° | 6.0 | 52.7 | −34.0 |
| 298 | 201.0° | 20.1° | 129.5° | 17.0 | 49.4 | −30.5 |
| 299 | 201.3° | 20.4° | 181.5° | 16.1 | 44.5 | −27.6 |
| 300 | 200.3° | 25.4° | 0.4° | 17.0 | 45.0 | −19.5 |
| 301 | 199.5° | 30.5° | 1.2° | 21.7 | 45.9 | −7.1 |
| 302 | 198.5° | 30.5° | 51.1° | 7.0 | 49.9 | −7.0 |
| 303 | 199.0° | 29.8° | 79.5° | 4.2 | 52.8 | −8.0 |
| 304 | 200.5° | 28.5° | 130.5° | 19.0 | 50.6 | −5.0 |
| 305 | 199.5° | 30.5° | 181.2° | 21.7 | 45.9 | −7.1 |
| 306 | 197.0° | 40.4° | 0.5° | 24.5 | 47.3 | −0.8 |
| 307 | 199.5° | 40.5° | 0.4° | 24.7 | 47.3 | 0.9 |
| 308 | 199.5° | 40.5° | 50.5° | 10.5 | 51.0 | 1.0 |
| 309 | 199.5° | 40.9° | 80.5° | 2.0 | 52.8 | 1.0 |
| 310 | 199.5° | 41.0° | 131.0° | 20.3 | 50.6 | 0.7 |
| 311 | 199.5° | 40.5° | 180.4° | 24.7 | 47.3 | 0.9 |
| 312 | 200.8° | 50.1° | 0.5° | 24.6 | 49.5 | −8.7 |
| 313 | 200.5° | 49.8° | 49.8° | 12.1 | 51.3 | −10.0 |
| 314 | 200.1° | 49.9° | 79.5 | 0.5 | 52.9 | −11.0 |
| 315 | 201.0° | 49.9° | 131.0° | 18.6 | 51.3 | −15.0 |
| 316 | 200.8° | 50.1° | 180.5° | 24.6 | 49.5 | −8.7 |
| 317 | 200.3° | 60.3° | 1.0° | 20.4 | 51.0 | −27.4 |
| 318 | 200.5 | 60.5° | 50.4° | 11.0 | 52.0 | −30.5 |
| 3 | 201.0° | 61.5° | 80.4° | 1.0 | 52.9 | −31.0 |
| 320 | 200.5° | 61.5° | 130.5° | 15.3 | 52.3 | −34.0 |
| 321 | 200.3° | 60.3° | 181.0° | 20.4 | 51.0 | −27.4 |
| 322 | 205.5° | 31.4° | 0.5° | 21.2 | 46.0 | −0.9 |
| 323 | 205.6° | 33.6° | 0.5° | 22.0 | 46.0 | 1.0 |
| 324 | 204.6° | 43.0° | 1.0° | 24.5 | 48.0 | 0.9 |
| 325 | 205.0° | 45.2° | 1.0° | 24.1 | 48.5 | −1.0 |
| 326 | 211.5° | 0.8° | 1.5° | 5.4 | 43.5 | −73.0 |
| 327 | 210.5° | 0.9° | 49.3° | 4.0 | 48.5 | −71.0 |
| 328 | 210.5° | 1.5° | 79.5° | 1.0 | 52.7 | −67.0 |
| 329 | 210.3° | 1.5° | 129.5° | 4.0 | 48.9 | −75.0 |
| 330 | 211.5° | 0.8° | 181.5° | 5.4 | 43.5 | −73.0 |
| 331 | 209.5° | 19.5° | 2.0° | 17.1 | 44.5 | −23.1 |
| 332 | 210.0° | 20.3° | 50.9° | 10.6 | 49.5 | −25.0 |
| 333 | 210.0° | 20.3° | 81.0° | 2.5 | 52.7 | −30.5 |
| 334 | 210.5° | 20.3° | 131.5° | 10.4 | 49.4 | −23.0 |
| 335 | 209.5° | 19.5° | 182.0° | 17.1 | 44.5 | −23.1 |
| 336 | 210.5° | 22.5° | 0.4° | 19.5 | 44.6 | −16.5 |
| 337 | 210.5° | 27.5° | 0.5° | 22.0 | 45.8 | −0.9 |
| 338 | 208.9° | 29.8° | 1.1° | 23.0 | 46.2 | 0.8 |
| 339 | 209.5° | 30.2° | 50.1° | 14.1 | 49.9 | 1.0 |
| 340 | 209.5° | 29.5° | 83.0° | 3.7 | 52.8 | 1.0 |
| 341 | 209.3° | 29.5° | 130.5° | 14.1 | 50.0 | 0.9 |
| 342 | 208.9° | 29.8° | 181.1° | 23.0 | 46.0 | 0.8 |
| 343 | 210.8° | 41.5° | 0.4° | 26.2 | 47.6 | 6.5 |
| 344 | 210.5° | 40.5° | 49.4° | 16.2 | 50.6 | 7.0 |
| 345 | 210.5° | 40.3° | 80.9° | 4.3 | 52.8 | 10.0 |
| 346 | 210.2° | 40.3° | 131.0° | 16.0 | 50.8 | 5.0 |
| 347 | 210.8° | 41.5° | 180.4° | 26.2 | 47.6 | 6.5 |
| 348 | 210.4° | 45.2° | 0.6° | 25.9 | 48.0 | 1.0 |
| 349 | 210.0° | 47.5° | 0.5° | 25.7 | 48.5 | −0.9 |
| 350 | 211.5° | 50.3° | 0.9° | 25.7 | 49.1 | −4.8 |
| 351 | 211.5° | 50.3° | 50.3° | '16.1 | 51.3 | −10.0 |
| 352 | 211.5° | 54° | 80.9° | 4.3 | 52.9 | −5.0 |

| | | | | | | |
|---|---|---|---|---|---|---|
| 353 | 211.5° | 50.5° | 130.4° | 16.1 | 51.3 | −4.6 |
| 354 | 211.5° | 50.3° | 180.9° | 25.7 | 49.1 | −4.8 |
| 355 | 210.3° | 60.1° | 0.3° | 21.5 | 51.0 | −27.0 |
| 356 | 210.5° | 60.1° | 50.4° | 13.5 | 52.0 | −25.0 |
| 357 | 210.5° | 60.5° | 80.5° | 3.7 | 53.5 | −31.0 |
| 358 | 210.6° | 60.5° | 130.9° | 13.7 | 52.0 | −29.0 |
| 359 | 210.3° | 60.1° | 180.3° | 21.5 | 51.0 | −27.0 |
| 360 | 215.0° | 31.3° | 0.5° | 23.5 | 46.0 | −1.0 |
| 361 | 215.5° | 33.5° | 0.5° | 24.4 | 46.2 | 0.8 |
| 362 | 215.6° | 43.0° | 0.4° | 25.9 | 47.5 | 361 |
| 361 | 215.7° | 45.5° | 0.4° | 25.8 | 48.0 | −1.0 |
| 364 | 221.5° | 0.5° | 1.2° | 5.3 | 44.0 | −69.5 |
| 365 | 220.5° | 0.5° | 51.2° | 11.6 | 491 | −70.6 |
| 366 | 220.5° | 0.4° | 81.7° | 10.5 | 52.7 | −71.0 |
| 367 | 220.1° | 1.5° | 129.5° | 3.6 | 48.9 | −69.0 |
| 368 | 221.5° | 0.5° | 181.2° | 5.3 | 44.0 | −69.5 |
| 369 | 221.0° | 20.1° | 1.1° | 16.0 | 45.0 | −30.5 |
| 370 | 220.4° | 20.1° | 51.8° | 17.1 | 49.4 | −30.5 |
| 371 | 219.5° | 20.9° | 80.4° | 11.4 | 53.5 | −32.0 |
| 372 | 219.5° | 20.8° | 131.0° | 2.9 | 49.4 | −36.0 |
| 373 | 221.0° | 20.1° | 181.1° | 16.0 | 45.0 | −30.5 |
| 374 | 220.4° | 25.5° | 0.4° | 18.3 | 45.1 | −18.2 |
| 375 | 221.7° | 30.5° | 2.5° | 21.1 | 46.3 | −7.5 |
| 376 | 219.7° | 30.5° | 49.8° | 8.3 | 50.5 | −7.0 |
| 377 | 219.7° | 29.4° | 79.1° | 11.2 | 52.8 | −8.0 |
| 378 | 220.5° | 29.4° | 129.5° | 7.2 | 49.9 | −10.5 |
| 379 | 221.7° | 30.5° | 182.5° | 21.1 | 46.3 | −7.5 |
| 380 | 222.7° | 40.4° | 0.5° | 24.7 | 47.5 | −0.9 |
| 381 | 220.1° | 41.0° | 0.4° | 24.8 | 47.6 | 0.7 |
| 382 | 221.0° | 41.0° | 50.1° | 20.3 | 51.1 | 1.0 |
| 383 | 221.0° | 41.5° | 79.5° | 10.0 | 52.8 | 0.9 |
| 384 | 220.5° | 39.9° | 131.0° | 10.8 | 50.6 | 1.0 |
| 385 | 220.1° | 41.0° | 180.4° | 24.8 | 47.6 | 0.7 |
| 386 | 220.5° | 50.4° | 0.5° | 24.5 | 49.2 | −8.4 |
| 387 | 220.4° | 50.3° | 50.4° | 18.6 | 51.3 | −9.0 |
| 388 | 220.5° | 50.3° | 80.5° | 8.4 | 52.9 | −8.4 |
| 389 | 220.5° | 50.3° | 130.1° | 12.1 | 51.3 | −10.0 |
| 390 | 220.5° | 50.4° | 180.5° | 24.5 | 49.2 | −8.4 |
| 391 | 220.1° | 60.4° | 0.9° | 20.4 | 51.0 | −28.0 |
| 392 | 220.5° | 60.5° | 49.1° | 14.5 | 52.0 | −28.0 |
| 393 | 220.6° | 61.0° | 79.5° | 5.6 | 53.2 | −30.5 |
| 394 | 221.0° | 61.0° | 131.0° | 11.3 | 52.0 | −33.0 |
| 395 | 220.1° | 60.4° | 180.9° | 20.4 | 51.0 | −28.0 |
| 396 | 231.0° | 0.4° | 1.0° | 5.8 | 43.2 | −67.5 |
| 397 | 230.5° | 0.4° | 49.7° | 17.0 | 49.7 | −70.6 |
| 398 | 230.5° | 1.0° | 77.5° | 17.4 | 53.0 | −72.0 |
| 399 | 230.5° | 1.0° | 128.5° | 9.2 | 49.8 | −73.0 |
| 400 | 231.0° | 0.4° | 181.0° | 5.8 | 43.2 | −67.5 |
| 401 | 230.7° | 20.1° | 1.1° | 13.8 | 44.6 | −41.0 |
| 402 | 231.0° | 20.1° | 48.9° | 20.5 | 49.4 | −41.0 |
| 403 | 231.0° | 20.9° | 79.5° | 17.3 | 52.7 | −42.5 |
| 404 | 231.0° | 20.8° | 129.4° | 3.7 | 50.1 | −40.5 |
| 405 | 230.7° | 20.1° | 181.° | 13.8 | 44.6 | −41.0 |
| 406 | 230.6° | 31.0° | 1.4° | 18.2 | 46.3 | −22.4 |
| 407 | 231.0° | 31.0° | 49.5° | 21.8 | 51.0 | −20.5 |
| 408 | 231.0° | 32.0° | 78.9° | 16.1 | 53.1 | −25.0 |
| 409 | 230.5° | 31.9° | 131.0° | 0.7 | 49.9 | −26.0 |
| 410 | 230.6° | 31.0° | 181.4° | 18.2 | 46.3 | −22.4 |
| 411 | 230.5° | 34.5° | 0.5° | 20.0 | 46.5 | −19.0 |
| 412 | 229.5° | 40.5° | 1.0° | 22.0 | 47.5 | −13.5 |
| 413 | 230.4° | 40.5° | 50.3° | 21.5 | 50.6 | −15.0 |
| 414 | 230.4° | 39.5° | 80.5° | 14.0 | 53.7 | −20.5 |
| 415 | 230.4° | 39.5° | 130.4° | 5.0 | 50.6 | −12.0 |
| 416 | 229.5° | 40.5° | 181.0° | 22.0 | 47.5 | −13.5 |
| 417 | 230.4° | 50.1° | 0.4° | 21.5 | 49.1 | −18.0 |
| 418 | 230.4° | 50.2° | 50.4° | 19.5 | 51.3 | −18.3 |
| 419 | 230.5° | 50.2° | 80.5° | 11.0 | 52.9 | −17.0 |
| 420 | 230.5° | 50.4° | 131.1° | 7.9 | 51.3 | −25.0 |
| 421 | 230.4° | 50.1° | 180.4° | 21.5 | 49.1 | −18.0 |
| 422 | 231.0° | 60.1° | 1.1° | 19.5 | 50.7 | −33.0 |
| 423 | 230.5° | 60.5° | 49.8° | 15.6 | 52.0 | −34.0 |
| 424 | 230.5° | 61.4° | 78.5° | 7.0 | 53.4 | −35.0 |
| 425 | 230.5° | 60.5° | 129.4° | 8.7 | 52.0 | −29.0 |
| 426 | 231.0° | 60.1° | 181.1° | 19.5 | 50.7 | −33.0 |
| 427 | 240.5° | 1.1° | 1.4° | 5.1 | 43.1 | −74.0 |
| 428 | 240.4° | 1.1° | 49.5° | 19.2 | 48.9 | −71.0 |
| 429 | 240.4° | 1.2° | 77.9° | 19.4 | 53.2 | −75.0 |
| 430 | 241.0° | 0.3° | 128.9° | 11.3 | 48.9 | −74.0 |
| 431 | 240.5° | 1.1° | 181.4° | 5.1 | 43.1 | −74.0 |
| 432 | 241.0° | 20.5° | 0.4° | 9.5 | 45.0 | −56.0 |
| 433 | 241.0° | 20.5° | 50.8° | 20.0 | 49.4 | −56.0 |
| 434 | 241.0° | 21.0° | 79.5° | 18.7 | 52.7 | −59.0 |
| 435 | 241.0° | 21.0° | 130.4° | 7.1 | 49.4 | −61.0 |
| 436 | 241.0° | 20.5° | 180.4° | 9.5 | 45.0 | −56.0 |
| 437 | 241.2° | 29.8° | 0.9° | 13.4 | 46.0 | −43.0 |
| 438 | 240.5° | 29.8° | 50.4° | 20.4 | 49.9 | −41.5 |
| 439 | 240.5° | 30.5° | 80.9° | 16.8 | 52.8 | −43.0 |
| 440 | 240.5° | 30.5° | 130.5° | 3.4 | 51.0 | −41.5 |
| 441 | 241.2° | 29.8° | 180.9° | 13.4 | 46.0 | −43.0 |
| 442 | 239.6° | 40.5° | 1.9° | 16.4 | 47.1 | −34.0 |
| 443 | 240.5° | 41.5° | 49.0° | 18.9 | 51.0 | −30.0 |
| 444 | 240.5° | 41.0° | 80.0° | 15.9 | 53.4 | −35.0 |
| 445 | 240.5° | 40.8° | 131.5° | 1.0 | 50.6 | −34.0 |
| 446 | 239.6° | 40.5° | 181.9° | 16.4 | 47.1 | −34.0 |
| 447 | 242.0° | 50.7° | 0.4° | 17.5 | 49.0 | −32.5 |
| 448 | 240.5° | 50.7° | 48.5° | 18.0 | 51.3 | −34.0 |
| 449 | 240.5° | 51.0° | 79.4° | 10.9 | 53.0 | −33.0 |
| 450 | 240.5° | 51.0° | 130.1° | 4.8 | 51.3 | −31.0 |
| 451 | 242.0° | 50.7° | 180.4° | 17.5 | 49.0 | −32.5 |
| 452 | 240.3° | 61.0° | 1.4° | 16.5 | 51.0 | −40.5 |
| 453 | 240.5° | 61.0° | 50.3° | 14.2 | 52.0 | −43.0 |
| 454 | 239.5° | 59.8° | 80.7° | 7.9 | 53.4 | −40.5 |
| 455 | 241.0° | 59.5° | 130.0° | 6.7 | 52.0 | −38.0 |
| 456 | 240.3° | 61.0° | 181.4° | 16.5 | 51.0 | −40.5 |

TABLE 3

| No. | $\phi$ | $\psi$ | $\theta$ | $\kappa$ (%) | $\epsilon^T/\epsilon_o$ | $\frac{1}{f_r}\frac{\Delta f_r}{\Delta T}$ |
|---|---|---|---|---|---|---|
| 457 | 300.5° | 0.5° | 0.5° | 6.6 | 43.0 | −70.1×10⁻⁶/°C. |
| 458 | 300.5° | 0.5° | 50.4° | 12.0 | 48.5 | −70.5 |
| 459 | 300.5° | 0.2° | 81.0° | 17.0 | 52.5 | −69.0 |
| 460 | 300.5° | 0.2° | 131.5° | 19.1 | 48.1 | −68.0 |
| 461 | 300.5° | 0.5° | 180.5° | 6.6 | 43.0 | −70.1 |
| 462 | 301.4° | 21.0° | 1.0° | 10.0 | 44.2 | −55.0 |
| 463 | 301.4° | 21.0° | 49.8° | 7.0 | 49.2 | −55.1 |
| 464 | 301.4° | 21.4° | 79.4° | 15.5 | 52.7 | −54.0 |
| 365 | 301.4° | 21.2° | 131.5° | 20.5 | 49.0 | −54.5 |
| 466 | 301.4° | 21.0° | 181.0° | 10.0 | 44.2 | −55.0 |
| 467 | 298.9° | 30.5° | 1.2° | 13.7 | 45.0 | −42.0 |
| 468 | 298.9° | 30.5° | 47.9° | 6.5 | 51.7 | −43.0 |
| 469 | 298.9° | 30.1° | 78.9°° | 12.3 | 52.3 | −40.0 |
| 470 | 298.9° | 30.1° | 130.0° | 20.0 | 49.5 | −42.2 |
| 471 | 298.9° | 30.5° | 181.2° | 13.7 | 45.0 | −42.0 |
| 472 | 297.9° | 40.5° | 0.3° | 16.5 | 47.0 | −32.2 |
| 473 | 297.9° | 40.5° | 50.2° | 1.0 | 50.7 | −32.5 |
| 474 | 297.9° | 39.5° | 80.5° | 9.0 | 52.5 | −30.7 |
| 475 | 297.9° | 39.2° | 129.5° | 19.5 | 50.6 | −33.0 |
| 476 | 297.9° | 40.5° | 180.3° | 16.5 | 47.0 | −32.2 |
| 477 | 301.4° | 50.4° | 0.9° | 18.0 | 48.7 | −31.0 |
| 478 | 301.4° | 50.4° | 49.2° | 5.0 | 51.5 | −30.5 |
| 479 | 301.4° | 50.9° | 79.2° | 5.5 | 52.7 | −31.0 |
| 480 | 301.4° | 51.0° | 131.4° | 17.0 | 51.2 | −32.0 |
| 481 | 301.4° | 50.4° | 180.9° | 18.0 | 48.7 | −31.0 |
| 482 | 300.7° | 60.1° | 1.3° | 16.5 | 50.5 | −39.0 |
| 483 | 300.7° | 60.5° | 50.3° | 6.5 | 51.9 | −39.2 |
| 484 | 300.7° | 60.5° | 80.5° | 2.0 | 52.8 | −38.0 |
| 485 | 300.7° | 61.0° | 131.1° | 14.5 | 51.0 | −37.0 |
| 486 | 300.7° | 60.1° | 181.3° | 16.5 | 50.5 | −39.0 |
| 487 | 310.4° | 0.5° | 1.0° | 13.0 | 43.2 | −71.0 |
| 488 | 310.4° | 0.5° | 50.1° | 3.7 | 48.0 | −70.0 |
| 489 | 310.4° | 1.1° | 79.4° | 12.5 | 52.5 | −69.0 |
| 490 | 310.4° | 1.1° | 130.5° | 20.4 | 48.5 | −72.0 |
| 491 | 310.4° | 0.5° | 181.0° | 13.0 | 43.2 | −71.0 |
| 492 | 311.4° | 20.1° | 1.3° | 18.2 | 44.3 | −39.0 |
| 493 | 311.4° | 21.5° | 49.3° | 0.7 | 49.2 | −38.5 |
| 494 | 311.4° | 21.5° | 78.9° | 10.5 | 52.5 | −38.0 |
| 495 | 311.4° | 21.0° | 130.4° | 21.5 | 49.0 | −39.0 |
| 496 | 311.4° | 20.1° | 181.3° | 18.2 | 44.3 | −39.0 |
| 497 | 309.8° | 31.5° | 2.1° | 21.5 | 45.0 | −22.5 |
| 498 | 309.8° | 29.4° | 49.7° | 5.0 | 49.5 | −22.1 |
| 499 | 309.8° | 29.2° | 77.9° | 7.0 | 52.5 | −21.0 |
| 500 | 309.8° | 29.2° | 128.1° | 21.7 | 49.3 | −20.5 |
| 501 | 309.8° | 31.5° | 182.1° | 21.5 | 45.0 | −22.5 |
| 502 | 310.2° | 35.3° | 0.5° | 19.0 | 46.0 | −19.6 |
| 503 | 309.2° | 40.5° | 1.4° | 21.3 | 47.0 | −13.2 |
| 504 | 309.2° | 40.5° | 50.0° | 5.0 | 50.0 | −13.5 |
| 505 | 309.2° | 41.0° | 80.4° | 7.0 | 52.3 | −13.0 |
| 506 | 309.2° | 41.0° | 130.4° | 21.5 | 50.1 | −14.0 |
| 507 | 309.2° | 40.5° | 181.4° | 21.3 | 47.0 | −13.2 |
| 508 | 310.4° | 51.0° | 0.0° | 21.7 | 48.5 | −18.5 |
| 509 | 310.4° | 51.0° | 49.3° | 8.0 | 51.0 | −17.5 |
| 510 | 310.4° | 51.5° | 79.1° | 3.5 | 53.0 | −19.0 |
| 511 | 310.4° | 51.5° | 131.2° | 19.5 | 51.2 | −18.0 |
| 512 | 310.4° | 51.0° | 180.0° | 21.7 | 48.5 | 18.5 |
| 513 | 310.3° | 60.5° | 1.1° | 19.5 | 50.3 | −32.5 |
| 514 | 310.3° | 60.5° | 50.4° | 9.0 | 52.0 | −32.0 |
| 515 | 310.3° | 61.0° | 79.4° | 2.0 | 52.9 | −34.0 |
| 516 | 310.3° | 61.3° | 131.1° | 15.0 | 51.5 | −30.0 |
| 517 | 310.3° | 60.5° | 181.1° | 19.5 | 50.3 | −32.5 |
| 518 | 320.4° | 1.0° | 0.8° | 6.6 | 43.0 | −72.0 |
| 519 | 320.4° | 1.0° | 50.4° | 3.5 | 49.0 | −70.0 |
| 520 | 320.4° | 1.1° | 79.8° | 8.5 | 53.0 | −68.0 |
| 521 | 320.4° | 1.1° | 131.9° | 11.5 | 49.0 | −67.0 |
| 522 | 320.4° | 1.0° | 180.8° | 6.6 | 43.0 | −72.0 |
| 523 | 321.0° | 20.1° | 1.1° | 16.5 | 44.0 | −27.0 |
| 524 | 321.0° | 20.1° | 49.3° | 3.0 | 49.2 | −30.0 |
| 525 | 321.0° | 20.4° | 79.2° | 6.0 | 52.5 | −25.0 |
| 526 | 321.0° | 20.7° | 131.7° | 17.1 | 49.5 | −27.0 |
| 527 | 321.0° | 20.1° | 181.1° | 16.5 | 44.0 | −27.0 |
| 528 | 320.2° | 25.1° | 0.6° | 17.3 | 44.6 | −18.7 |
| 529 | 320.1° | 29.4° | 1.0° | 21.3 | 45.0 | −7.0 |

| | | | | | | |
|---|---|---|---|---|---|---|
| 530 | 320.1° | 29.4° | 49.0° | 7.5 | 49.7 | −8.0 |
| 531 | 320.1° | 29.5° | 79.0° | 4.5 | 52.7 | −9.0 |
| 532 | 320.1° | 30.0° | 130.4° | 19.5 | 49.1 | −10.0 |
| 533 | 320.1° | 29.4° | 181.0° | 21.3 | 45.0 | −7.0 |
| 534 | 317.2° | 40.3° | 0.4° | 24.3 | 47.5 | −1.0 |
| 535 | 319.6° | 40.1° | 0.5° | 24.7 | 47.0 | 1.0 |
| 536 | 319.6° | 40.1° | 50.4° | 10.5 | 50.0 | 0.9 |
| 537 | 319.6° | 41.0° | 78.2° | 2.0 | 52.8 | 1.0 |
| 538 | 319.6° | 41.0° | 130.5° | 20.3 | 50.5 | 0.5 |
| 539 | 319.6° | 40.1° | 180.5° | 24.7 | 47.0 | 1.0 |
| 540 | 320.5° | 50.5° | 0.2° | 24.5 | 48.9 | −8.0 |
| 541 | 320.5° | | 50.4° | 12.0 | 51.2 | −8.5 |
| 542 | 320.5° | 50.1° | 79.1° | 1.0 | 52.8 | −9.0 |
| 543 | 320.5° | 50.2° | 130.1° | 18.0 | 51.2 | −7.0 |
| 544 | 320.5° | 50.5° | 180.2° | 24.5 | 48.9 | −8.0 |
| 545 | 321.2° | 60.2° | 0.4° | 20.5 | 50.5 | −27.5 |
| 546 | 321.2° | 60.2° | 50.4° | 11.0 | 51.9 | −30.1 |
| 547 | 321.2° | 61.7° | 80.0° | 2.0 | 52.3 | −29.0 |
| 548 | 321.2° | 61.5° | 130.4° | 15.5 | 51.0 | −27.0 |
| 549 | 321.2° | 60.5° | 180.4° | 20.5 | 50.5 | −27.5 |
| 550 | 324.5° | 31.4° | 0.6° | 22.3 | 46.1 | −1.0 |
| 551 | 324.5° | 33.7° | 1.0 | 23.0 | 46.3 | 0.9 |
| 552 | 325.4° | 45.5° | 0.6° | 25.2 | 48.0 | 1.0 |
| 553 | 325.6° | 47.8° | 0.5° | 24.8 | 48.5 | −0.8 |
| 554 | 330.4° | 1.0° | 0.5° | 6.5 | 43.0 | −70.0 |
| 555 | 330.4° | 1.0° | 50.4° | 4.0 | 49.0 | −69.0 |
| 556 | 330.4° | 1.7° | 81.9° | 1.0 | 53.0 | −67.0 |
| 557 | 330.4° | 1.5° | 131.4° | 4.0 | 49.5 | −71.0 |
| 558 | 330.4° | 1.0° | 180.5° | 6.5 | 43.0 | −70.0 |
| 559 | 331.0° | 19.5° | 1.2° | 17.2 | 44.2 | −22.0 |
| 560 | 331.0° | 19.5° | 48.9° | 10.6 | 49.0 | −20.0 |
| 561 | 331.0° | 19.7° | 80.4° | 2.7 | 53.0 | −20.5 |
| 562 | 331.0° | 19.8° | 132.0° | 10.7 | 49.1 | −21.0 |
| 563 | 331.0° | 19.5° | 181.2° | 17.2 | 44.2 | −22.0 |
| 564 | 330.4° | 22.5° | 0.5° | 20.0 | 44.5 | −13.0 |
| 565 | 330.5° | 27.5° | 0.5° | 22.6 | | −0.8 |
| 566 | 329.5° | 30.1° | 1.0° | 23.4 | 45.0 | 0.8 |
| 567 | 329.5° | 30.1° | 50.0° | 14.0 | 49.5 | 1.0 |
| 568 | 329.5° | 29.4° | 81.0° | 4.0 | 52.9 | 0.9 |
| 569 | 329.5° | 29.1° | 132.1° | 14.5 | 49.0 | 0.5 |
| 570 | 329.5° | 30.1° | 181.0° | 23.4 | 45.0 | 0.8 |
| 571 | 329.8° | 40.1° | 0.1° | 26.0 | 47.0 | 6.0 |
| 572 | 329.8° | 40.1° | 50.1° | 16.0 | 50.5 | 7.0 |
| 573 | 329.8° | 40.2° | 81.5° | 4.0 | 53.0 | 5.0 |
| 574 | 329.8° | 40.9° | 131.1° | 15.5 | 50.3 | 5.0 |
| 575 | 329.8° | 40.1° | 180.1° | 26.0 | 47.0 | 6.0 |
| 576 | 330.5° | 45.0° | 0.1° | 25.9 | 48.0 | 0.9 |
| 577 | 330.5° | 47.5° | 0.2° | 25.8 | 48.4 | −1.0 |
| 578 | 330.5° | 50.4° | 0.0° | 25.5 | 49.0 | −4.5 |
| 579 | 330.5° | 50.4° | 49.1° | 16.0 | 51.2 | −4.6 |
| 580 | 330.5° | 50.5° | 81.9° | 4.0 | 52.8 | −5.0 |
| 581 | 330.5° | 50.3° | 131.4° | 16.0 | 51.0 | −4.0 |
| 582 | 330.5° | 50.4° | 180.0° | 25.5 | 49.0 | −4.5 |
| 583 | 331.0° | 60.3° | 1.1° | 21.0 | 50.2 | −26.5 |
| 584 | 331.0° | 60.3° | 50.4° | 13.5 | 52.0 | −25.0 |
| 585 | 331.0° | 61.1° | 79.4° | 4.0 | 53.0 | −26.0 |
| 586 | 331.0° | 60.7° | 130.0° | 13.5 | 51.5 | −28.0 |
| 587 | 331.0° | 60.3° | 181.1° | 21.0 | 50.2 | −26.5 |
| 588 | 335.1° | 31.5° | 0.4° | 22.0 | 46.3 | −1.0 |
| 589 | 335.2° | 33.7° | 0.4° | 23.0 | 46.5 | 0.8 |
| 590 | 335.1° | 45.1° | 0.5° | 25.2 | 48.0 | 0.8 |
| 591 | 335.2° | 47.5° | 0.2° | 24.5 | 48.3 | −0.9 |
| 592 | 340.5° | 0.5° | 1.7° | 6.7 | 43.0 | −70.0 |
| 593 | 340.5° | 0.5° | 48.1° | 11.5 | 49.0 | −71.0 |
| 594 | 340.5° | 0.7° | 79.3° | 10.5 | 52.5 | −72.0 |
| 595 | 340.5° | 0.7° | 130.4° | 4.0 | 49.5 | −67.0 |
| 596 | 340.5° | 0.5° | 181.7° | 6.7 | 47.0 | −70.0 |
| 597 | 340.2° | 20.1° | 0.1° | 16.5 | 44.5 | −27.5 |
| 598 | 340.2° | 20.1° | 49.1° | 17.0° | 49.1 | −30.0 |
| 599 | 340.2° | 20.5° | 79.7° | 11.5 | 52.7 | −28.0 |
| 600 | 340.2° | 20.5° | 129.1° | 3.0 | 49.5 | −27.5 |
| 601 | 340.2° | 20.1° | 180.1° | 16.5 | 44.5 | −27.5 |
| 602 | 340.3° | 25.0° | 0.6° | 18.4 | 44.9 | −17.8 |
| 603 | 341.7° | 29.5° | 0.0° | 22.0 | 45.2 | −7.0 |
| 604 | 341.7° | 29.5° | 49.0° | 20.0 | 49.5 | −8.0 |
| 605 | 341.7° | 29.7° | 78.4° | 11.0 | 52.8 | −9.5 |
| 606 | 341.7° | 30.4° | 129.5° | 7.0 | 49.7 | −10.1 |
| 607 | 341.7° | 29.5° | 180.0° | 22.0 | 45.2 | −7.0 |
| 608 | 342.5° | 40.2° | 0.1° | 24.5 | 47.0 | −1.0 |
| 609 | 339.4° | 40.4° | 0.8° | 25.0 | 47.0 | 0.6 |
| 610 | 339.4° | 40.4° | 48.2° | 20.0 | 50.3 | 1.0 |
| 611 | 339.4° | 40.3° | 79.5° | 10.5 | 52.9 | 1.0 |
| 612 | 339.4° | 40.3° | 130.0° | 10.5 | 50.6 | 0.5 |
| 613 | 339.4° | 40.4° | 180.8° | 25.0 | 47.0 | 0.6 |
| 614 | 340.2° | 51.0° | 0.2° | 24.5 | 49.0 | −8.0 |
| 615 | 340.2° | 51.0° | 50.1° | 19.0 | 51.0 | −8.0 |
| 616 | 340.2° | 50.5° | 79.4° | 8.5 | 51.2 | −9.0 |
| 617 | 340.2° | 50.5° | 130.4° | 12.0 | 50.0 | −10.0 |
| 618 | 340.2° | 51.0° | 180.2° | 24.5 | 49.0 | −8.0 |
| 619 | 340.7° | 60.3° | 1.0° | 21.0 | 50.1 | −28.0 |
| 620 | 340.7° | 59.4° | 49.2° | 15.0 | 52.0 | −30.0 |
| 621 | 340.7° | 59.1° | 79.4° | 6.0 | 53.0 | −30.5 |
| 622 | 340.7° | 58.0° | 131.0° | 13.0 | 51.5 | −27.0 |
| 623 | 340.7° | 60.3° | 181.0° | 21.0 | 50.1 | −28.0 |
| 624 | 350.4° | 0.3° | 1.1° | 6.5 | 42.8 | −70.0 |
| 625 | 350.4° | 0.3° | 49.1° | 17.5 | 48.9 | −69.0 |
| 626 | 350.4° | 0.9° | 77.4° | 17.5 | 52.0 | −67.0 |
| 627 | 350.4° | 0.9° | 128.1° | 9.0 | 49.0 | −65.0 |
| 628 | 350.4° | 0.3° | 181.1° | 6.5 | 42.8 | −70.0 |
| 629 | 351.1° | 19.7° | 0.1° | 14.0 | 44.2 | −40.0 |
| 630 | 351.1° | 19.7° | 50.1° | 20.5 | 49.3 | −39.0 |
| 631 | 351.1° | 19.9° | 79.4° | 17.0 | 52.7 | −32.8 |
| 632 | 351.1° | 20.1° | 130.4° | 4.0 | 49.5 | −41.0 |
| 633 | 351.1° | 19.7° | 180.1° | 14.0 | 44.2 | −40.0 |
| 634 | 350.8° | 31.5° | 0.5° | 19.0 | 45.5 | −22.5 |
| 635 | 350.8° | 31.5° | 49.5° | 21.5 | 49.5 | −20.5 |
| 636 | 350.8° | 30.4° | 79.5° | 16.0 | 52.8 | −30.1 |
| 637 | 350.8° | 30.4° | 130.4° | 0.7 | 49.0 | −25.0 |
| 638 | 350.8° | 31.5° | 180.5° | 19.0 | 45.5 | −22.5 |
| 639 | 350.2° | 35.5° | 0.1° | 20.0 | 46.5 | −19.1 |
| 640 | 348.9° | 40.3° | 0.2° | 21.0 | 47.5 | −14.0 |
| 641 | 348.9° | 41.1° | 48.7° | 21.5 | 50.0 | −15.0 |
| 642 | 348.9° | 41.1° | 77.9° | 14.0 | 53.0 | −20.5 |
| 643 | 348.9° | 42.0° | 131.0° | 5.0 | 50.5 | −10.4 |
| 644 | 348.9° | 40.3° | 180.2° | 21.0 | 47.5 | −14.0 |
| 645 | 350.0° | 50.4° | 0.4° | 21.9 | 48.5 | −18.0 |
| 646 | 350.0° | 50.3° | 50.8° | 19.5 | 51.0 | −20.0 |
| 647 | 350.0° | 50.3° | 79.2° | 11.0 | 52.5 | −25.0 |
| 648 | 350.0° | 50.5° | 130.0° | 8.0 | 51.5 | −18.0 |
| 649 | 350.0° | 50.4° | 180.4° | 21.9 | 48.5 | −18.0 |
| 650 | 351.1° | 61.1° | 1.1° | 19.4 | 50.0 | −33.0 |
| 651 | 351.1° | 60.3° | 48.1° | 15.5 | 51.5 | −29.0 |
| 652 | 351.1° | 60.3° | 77.2° | 7.5 | 52.8 | −26.0 |
| 653 | 351.1° | 59.4° | 130.5° | 8.5 | 51.0 | −40.0 |
| 654 | 351.1° | 61.1° | 181.1° | 19.4 | 50.0 | −33.0 |
| 655 | 360.1° | 0.1° | 0.0° | 6.7 | 43.1 | −71.0 |
| 656 | 360.1° | 0.1° | 50.0° | 19.0 | 49.0 | −69.0 |
| 657 | 360.1° | 0.5° | 78.1° | 20.0 | 53.0 | −70.0 |
| 658 | 360.1° | 0.5° | 130.0° | 11.0 | 49.0 | −70.5 |
| 659 | 360.1° | 0.1° | 180.0° | 6.7 | 43.1 | −71.0 |
| 660 | 360.0° | 19.7° | 0.5° | 10.0 | 44.2 | −55.0 |
| 661 | 360.0° | 19.7° | 50.3° | 20.5 | 49.5 | −50.0 |
| 662 | 360.0° | 19.9° | 80.0° | 18.5 | 52.5 | −60.0 |
| 663 | 360.0° | 20.1° | 131.5° | 7.5 | 49.1 | −61.0 |
| 664 | 360.0° | 19.7° | 180.5° | 10.0 | 44.2 | −55.0 |
| 665 | 359.4° | 30.1° | 0.9° | 14.1 | 45.7 | −41.5 |
| 666 | 359.4° | 31.0° | 50.4° | 20.5 | 49.8 | −40.0 |
| 667 | 359.4° | 31.0° | 81.4° | 17.0 | 52.3 | −45.0 |
| 668 | 359.4° | 31.5° | 129.4° | 3.0 | 48.0 | −43.0 |
| 669 | 359.4° | 30.1° | 180.9° | 14.1 | 45.7 | −41.5 |
| 670 | 359.1° | 40.5° | 0.7° | 17.1 | 47.2 | −32.0 |
| 671 | 359.1° | 40.5° | 49.1° | 20.1 | 50.0 | −32.0 |
| 672 | 359.1° | 40.5° | 77.9° | 15.0 | 54.0 | −30.5 |
| 673 | 359.1° | 40.3° | 127.9° | 2.0 | 52.0 | −29.0 |
| 674 | 359.1° | 40.5° | 180.7° | 17.1 | 47.2 | −32.0 |
| 675 | 360.0° | 50.1° | 0.4° | 18.0 | 49.1 | −30.0 |
| 676 | 360.0° | 50.1° | 50.3° | 18.1 | 51.0 | −29.0 |
| 677 | 360.0° | 50.4° | 77.7° | 11.5 | 52.9 | −33.0 |
| 678 | 360.0° | 50.4° | 128.3° | 5.0 | 50.0 | −34.0 |
| 679 | 360.0° | 50.1° | 180.4° | 18.0 | 49.1 | −30.0 |
| 680 | 361.0° | 60.5° | 0.4° | 16.5 | 50.5 | −39.0 |
| 681 | 361.0° | 60.5° | 50.1° | 14.5 | 52.0 | −40.0 |
| 682 | 361.0° | 59.5° | 79.1° | 8.0 | 54.0 | −45.0 |
| 683 | 361.0° | 59.5° | 129.3° | 6.5 | 51.0 | −40.5 |
| 684 | 361.0° | 60.5° | 180.4° | 16.5 | 50.5 | −39.0 |

TABLE 4

$\phi=90°, \theta=0°$

| No. | $\psi$ | $\theta$ | $\epsilon^T/\epsilon_0$ | $\frac{1}{f_r}\frac{\Delta f_r}{\Delta T}$ |
|---|---|---|---|---|
| 685 | −45.25° | 9.8% | 48.2 | $-55.5\times10^{-6}$/°C. |
| 686 | −40.92° | 8.4 | 47.8 | −60.6 |
| 687 | −30.50° | 5.2 | 45.6 | −69.8 |
| 688 | −22.59° | 4.5 | 44.9 | −74.0 |
| 689 | −11.22° | 4.3 | 43.2 | −75.7 |
| 690 | +0.27° | 6.6 | 43.0 | −68.0 |
| 691 | +10.33° | 11.8 | 43.1 | −44.2 |
| 692 | +22.57° | 19.1 | 44.8 | −9.5 |
| 693 | +26.33° | 21.0 | 45.9 | −3.2 |
| 694 | +27.55° | 21.7 | 46.1 | −1.0 |
| 695 | +28.42° | 22.1 | 46.2 | +0.8 |
| 696 | +30.20° | 22.9 | 46.9 | +2.5 |
| 697 | +39.23° | 25.6 | 49.1 | +5.7 |
| 698 | +45.54° | 25.9 | 50.3 | +4.0 |
| 699 | +47.46° | 25.4 | 49.8 | +1.5 |
| 700 | +48.71° | 25.2 | 49.2 | +0.3 |
| 701 | +49.20° | 25.1 | 48.6 | −1.0 |
| 702 | +49.75° | 24.9 | 48.3 | −1.7 |
| 703 | +50.63° | 24.8 | 47.4 | −4.0 |
| 704 | +55.72° | 23.5 | 46.0 | −9.8 |
| 705 | +59.10° | 22.8 | 45.0 | −15.5 |

What is claimed is:

1. A piezoelectric vibrator comprising a $LiTaO_3$ single-crystal plate having a (*zxtwl*) $\phi/\psi/\theta$ orientation, in which the angle $\phi$ lies within the range of about 68° to 113°, the angle $\psi$ lines within the range of about 22° to 57° and the angle $\theta$ lies within the ranges of 0° to 50.4° and 130.5° to 180°.

2. The piezoelectric vibrator claimed in claim 1, wherein the angles $\phi$ and $\psi$ lie within the range of about 75° to 108° and the range of about 25° to 54°, respectively.

3. A piezoelectric vibrator comprising a rectangular plate of a $LiTaO_3$ single crystal having an orientation expressed by (*zxtwl*) $\phi/\psi/\theta$, in which the combination of the angles $\phi$ and $\psi$ lies within a polygonal area A-B-C-D-E-F-G on a $\phi$-104 rectangular coordinate plane and the angle ¼ lies within the ranges of 0° to 50.4° and 130.5° to 180°, the angles $\phi$ and $\psi$ at the vertices of said area A-B-C-D-E-F-G being given by

| | $\phi$ | $\psi$ |
|---|---|---|
| A | 69.8° | 50.6° |
| B | 70.5° | 35.4° |
| C | 80.7° | 25.0° |
| D | 90.4° | 22.4° |
| E | 100.5° | 25.5° |
| F | 110.5° | 34.6° |
| G | 109.5° | 50.3° |

4. The piezoelectric vibrator claimed in claim 3, wherein the angle $\theta$ is within the range 0° to approximately 1.5°.

5. The piezoelectric vibrator claimed in claim 3, wherein the combination of the angles $\phi$ and $\psi$ are within a polygonal area H-I-J-K-L-M-N-O, of a $\phi$-$\psi$ rectangular coordinate plane, the combinations of the angles $\phi$ and $\psi$ at the vertices of said area H-I-J-K-L-M-N-O being given by

| | $\phi$ | $\psi$ |
|---|---|---|
| H | 78.4° | 40.5° |
| I | 85.4° | 31.5° |
| J | 90.5° | 27.5° |
| K | 95.2° | 31.2° |
| L | 102.2° | 40.5° |
| M | 95.4° | 46.5° |
| N | 90.1° | 47.0° |
| O | 84.5° | 46.0° |

6. The piezoelectric vibrator claimed in claim 5, wherein the angle $\theta$ is within the range 0° to about 1.5°.

7. The piezoelectric vibrator claimed in claim 5, wherein the combination of the angles $\phi$ and $\psi$ lies outside the polygonal area P-Q-R-S-T-U-V-W of said $\phi$-$\psi$ rectangular coordinate plane, the angles $\phi$ and $\psi$ at the vertices of said area P-Q-R-S-T-U-V-W being as follows:

| | $\phi$ | $\psi$ |
|---|---|---|
| P | 80.7° | 39.5° |
| Q | 85.4° | 33.5° |
| R | 90.7° | 30.5° |
| S | 95.2° | 33.5° |
| T | 99.7° | 40.5° |
| U | 95.4° | 44.3° |
| V | 90.5° | 45.0° |
| W | 84.5° | 44.0° |

8. The piezoelectric vibrator claimed in claim 1, wherein the angles $\phi$ and $\theta$ are 90° and 0°, respectively, and the angle $\psi$ is in the range from 22.57° to 55.72°.

* * * * *

UNITED STATES PATENT OFFICE
CERTIFICATE OF CORRECTION

Patent No. 3,644,761 Dated February 22, 1972

Inventor(s) Kikuo Doi, et al

It is certified that error appears in the above-identified patent and that said Letters Patent are hereby corrected as shown below:

Column 13, line 4, "lines" should read -- lies -- ; line 13, "ø-104" should read -- ø- [illegible] -- ; line 14, "1/4" should be -- [illegible] -- . Column 14, in the table on the L line, "102.2°" should be -- 102.0° -- .

Signed and sealed this 14th day of November 1972.

(SEAL)
Attest:

EDWARD M.FLETCHER,JR.
Attesting Officer

ROBERT GOTTSCHALK
Commissioner of Patents

USCOMM-DC 60376-P69
☆ U.S. GOVERNMENT PRINTING OFFICE : 1969 O—366-334.